(12) United States Patent
Banerjea et al.

(10) Patent No.: US 8,611,317 B2
(45) Date of Patent: Dec. 17, 2013

(54) SIMULTANEOUSLY MAINTAINING BLUETOOTH AND 802.11 CONNECTIONS TO INCREASE DATA THROUGHPUT

(75) Inventors: Raja Banerjea, Sunnyvale, CA (US); Robert Fanfelle, Redwood City, CA (US)

(73) Assignee: Marvell World Trade Ltd., St. Michael (BB)

(*) Notice: Subject to any disclaimer, the term of this patent is extended or adjusted under 35 U.S.C. 154(b) by 643 days.

(21) Appl. No.: 12/182,758

(22) Filed: Jul. 30, 2008

(65) Prior Publication Data

US 2009/0034498 A1 Feb. 5, 2009

Related U.S. Application Data

(60) Provisional application No. 60/952,744, filed on Jul. 30, 2007.

(51) Int. Cl.
*H04W 84/12* (2009.01)
*H04W 80/04* (2009.01)
*H04W 84/18* (2009.01)
*H04W 88/06* (2009.01)
*H04W 74/08* (2009.01)
*H04W 88/08* (2009.01)
*H04W 72/04* (2009.01)
*H04W 76/00* (2009.01)
*H04B 1/50* (2006.01)
*H04B 1/56* (2006.01)

(52) U.S. Cl.
USPC ............ 370/338; 370/328; 370/329; 370/339

(58) Field of Classification Search
USPC ................................. 370/336, 338
See application file for complete search history.

(56) References Cited

U.S. PATENT DOCUMENTS 6,430,395 B2 * 8/2002 Arazi et al. .................. 370/347
6,549,762 B1 4/2003 Hirabe
(Continued)

FOREIGN PATENT DOCUMENTS

CN 1472935 A 2/2004
EP 1489788 A2 12/2004
(Continued)

OTHER PUBLICATIONS

International Standard, ISO/IEC 8802-11, ANSI/IEEE Std 802.11, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner* — Ian N Moore
*Assistant Examiner* — Jenee Alexander

(57) ABSTRACT

A device for wirelessly communicating between one or more mobile communication devices over a wireless network. A primary mobile communication device is configured to establish one or more connections to one or more secondary mobile communication devices. The primary mobile communication device is further configured to establish a first connection and a second connection to at least one of the secondary mobile communication devices. The first connection is a Bluetooth (BT) connection and the second connection is a Wireless Fidelity (WiFi) connection. The primary mobile device is also configured to establish a third connection to another secondary mobile communication device wherein the third connection is a WiFi connection. Additionally, the primary mobile communication device is configured to simultaneously maintain the BT connection and the WiFi connections during the bi-directional transmission of data between the primary mobile communication device and the secondary mobile communication devices.

25 Claims, 16 Drawing Sheets

(56) References Cited

U.S. PATENT DOCUMENTS

| | | |
|---|---|---|
| 6,950,480 B2 | 9/2005 | Brown |
| 6,982,970 B2* | 1/2006 | Takabatake et al. .......... 370/329 |
| 7,568,031 B2* | 7/2009 | Tanimoto ...................... 709/225 |
| 7,643,463 B1* | 1/2010 | Linsky et al. ................. 370/344 |
| 7,689,168 B2* | 3/2010 | House .......................... 455/41.2 |
| 7,882,238 B2* | 2/2011 | Burns et al. ................... 709/227 |
| 2001/0006512 A1* | 7/2001 | Takabatake et al. .......... 370/329 |
| 2001/0006518 A1* | 7/2001 | Takabatake et al. .......... 370/329 |
| 2002/0086708 A1 | 7/2002 | Teo et al. |
| 2002/0136233 A1 | 9/2002 | Chen et al. |
| 2003/0083095 A1* | 5/2003 | Liang ............................ 455/552 |
| 2003/0195010 A1 | 10/2003 | Pattabiraman et al. |
| 2004/0071123 A1 | 4/2004 | Shin |
| 2005/0002372 A1* | 1/2005 | Rune et al. .................... 370/346 |
| 2005/0281236 A1* | 12/2005 | Takabatake et al. .......... 370/329 |
| 2006/0292986 A1* | 12/2006 | Bitran et al. ................. 455/562.1 |
| 2007/0165666 A1* | 7/2007 | Lifshitz et al. ................ 370/445 |
| 2008/0123610 A1* | 5/2008 | Desai et al. ................... 370/338 |
| 2008/0175379 A1* | 7/2008 | Hansen et al. .................. 380/44 |
| 2008/0240058 A1* | 10/2008 | Hansen et al. ................. 370/338 |
| 2008/0254745 A1* | 10/2008 | Zhang et al. ................. 455/41.2 |
| 2008/0310332 A1* | 12/2008 | Hansen et al. ................. 370/310 |
| 2008/0310354 A1* | 12/2008 | Hansen et al. ................. 370/329 |
| 2008/0310394 A1* | 12/2008 | Hansen et al. ................. 370/350 |

FOREIGN PATENT DOCUMENTS

| | | |
|---|---|---|
| EP | 1709753 A1 | 10/2006 |
| JP | 2004-104441 A | 4/2004 |
| JP | 2005-12815 | 1/2005 |
| JP | 2005-217909 A | 8/2005 |
| WO | WO 2004/114534 | 12/2004 |
| WO | WO 2005/107100 | 11/2005 |

OTHER PUBLICATIONS

Aoz, Specification of the Bluetooth System, Wireless connections made easy, Master Table of Contents & Compliance Requirements, Covered Core Package version: 2.0 + EDR Current Master TOC issues: Nov. 4, 2004.
Breslin, "Adaptive Antenna Arrays Applied to Position Location," Thesis (1997).
Cheney, "The Linear Sampling Method and the MUSIC Algorithm" (2003).
How 802.11b/g WLAN and Bluetooth Can Play, Without standards-bsed solutions, ICs must referee spectrum rivalry, (2005).
IEEE Std 802.11g/D2.8, May 2002 (Supplement to ANSI/IEEE Std 802.11, 1999 Edition), Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed PHysical Layer Extension in the 2.4 GHz Band.
IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band (Supplement to ANSI/IEEE Std 802.11 1999 (Reaff 2003)).
IEEE Std for Local and metropolitan area networks, 802.16, Part 16: Air Interface for Fixed Broadband Wireless Access Systems, IEEE Computer Society and the IEEE Microwave Theory and Techniques Society (2004).
IEEE P802.11n/D3.00, Draft Standard for Information Technology—Telecommunications and information exchange between systems—Local and metropolitan area networks—Specific Requirements—Part 11: Wireless LAN Medium Access Control (MAC) and Physical Layer (PHY) specifications: Amendment 4: Enhancements for Higher Throughput (2007).
IEEE 802.11h, Standard for Information Technology—Telecommunications and information exchange between systems—Local and metropolitan area networks—Specific requirements, Part 11: Wireless LAN Medium Access Control (MAC) and Physical Layer (PHY) specifications; Amendment 5: Spectrum and Transmit Power Management Extensions in the 5 GHz band in Europe (2003).
IEEE Std 802.11b-1999/Cor Jan. 2001, Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 2: Higher-speed Physical Layer (PHY) extension in the 2.4 GHz band—Corrigendum 1 (2001).
International Search Report from PCT/US2008/074209 dated Mar. 25, 2009.
International Standard, Information technology—Telecommunications and information exchange between systems—Local and metropolitan area networks—Specific requirements—Part 11: Wireless LAN Medium Access Control (MAC) and Physical Layer (PHY) specifications, ISO/IEC 8802-11, ANSI/IEEE Std 802.11 (1999).
Spectral Estimation Using a MUSIC Algorithm, Nios II Embedded Processor Design Contest—Outstanding Designs 2005.
Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b-1999.
Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, IEEE Std 802.11a-1999.
TGn Sync Proposal Technical Specification , IEEE P802.11 Wireless LANs 2005.
Written Opinion from PCT/US2008/074209 dated Mar. 25, 2009.
Barr, J.R.:"Bluetooth Wireless Technology Overview," Sep. 19, 2007, 1-20, found online at https://mentor.ieee.org/802.11/public-file/07/11-07-2361-00-0000-bluetooth-r-wireless-technology-overview.ppt.
Barr, J.R., "Bluetooth SIG Overview," May 16, 2007, 1-14 found online at https://mentor.ieee.org/802.11/file/07/11-07-0747-00-0000-bluetooth-sig-overview.ppt.
Lansford et al., "Wi-If (802.11b) and Bluetooth: Enabling Coexistence," IEEE Network, Sep./Oct. 2001, 20-27.
International Search Report from PCT/US2008/071623 dated Dec. 15, 2008.
Written Opinion from PCT/US2008/071623 dated Dec. 15, 2008.
First Office Action in Chinese Application No. 200880101439.6, dated Feb. 29, 2012.
European Search Report from Application No. 11010015.3-2412 dated May 25, 2012.
Office action issued in JP Application No. 2010-520155 dated Nov. 13, 2012, including English translation.
Bluetooth® SIG Overview, IEEE 802.11-07/0747r0 (2007).
Bluetooth® Wireless Technology Overview, IEEE 802.11-07/2361r0 (2007).
European Search Report from Application No. 11010015.3-2412 dated Feb. 9, 2012.
Lansford et al., "Wi-Fi (802.11b) and Bluetooth: Enabling Coexistence," IEEE Network 20-27 (2001).
Translation of Second Office Action in corresponding Chinese application No. 200880101439.6 dated Feb. 5, 2013.

* cited by examiner

SIMULTANEOUSLY MAINTAINING BLUETOOTH AND 802.11 CONNECTIONS TO INCREASE DATA THROUGHPUT

CROSS-REFERENCES TO RELATES APPLICATIONS

The present application claims the benefit of U.S. Provisional Application No. 60/952,744, entitled "BT 802.11 AMP," filed on Jul. 30, 2007, which is hereby incorporated by reference herein in its entirety.

FIELD OF THE TECHNOLOGY

The present disclosure relates generally to communication systems, and more particularly, to wireless communication systems that jointly use a Bluetooth connection and an 802.11 connection to wirelessly communicate data between mobile communication devices.

DESCRIPTION OF THE RELATED ART

Wireless networks continue to increase in demand as consumers flock toward mobile computing devices and as manufacturers continue to develop wireless devices with greater capabilities. The proliferation of wireless networks is widespread and diverse. Many consumers use local area wireless networks in their homes to provide internet access to multiple devices. Many of those same consumers employ personal area wireless networks for interconnecting handheld or mobile devices. Finally many cities have begun arranging wireless networks to provide connectivity over large metropolitan areas.

There are numerous types of wireless networks and network protocols. Wireless local area networks (WLAN) typically include one of the various Institute of Electrical and Electronics Engineers (IEEE) 802.11 standard wireless protocols, first promulgated in 1999. These protocols include IEEE 802.11a, 802.11b, 802.11n, and 802.11g, which operate at different spectrum bands and/or different multiplexing or spread spectrum schemes to deliver various bit rates to devices on the network. These 802.11 standards are also implied hereinbelow when the term "WiFi" network or similar term is used hereinbelow. There is no implication in this document that devices described as part of a WiFi network have successfully passed conformance or interoperability testing for instance that testing providing by the Wi-Fi Alliance Special Interest Group.

Another type of wireless network is collectively known as a wireless personal area network (WPAN) which involves the interconnection of devices that are typically, but not necessarily, physically located closer together than wireless local area networks (WLAN). An example of a popular WPAN is based on the Bluetooth set of wireless protocol specifications as well as described in the IEEE 802.15.1 standard wireless protocols.

Either networking technology may support connections to multiple devices simultaneously including laptop computers, handheld computers, printers, storage media, cellular telephones or digital media players. In some examples, especially those involving WiFi networks, the wireless devices may be contained in other network equipment, such as access points, routers, switches, etc. to allow information transfer beyond the immediate wireless network and to a larger interconnected network.

Each networking technology has its own advantages. Bluetooth technology incorporates profiles that enable devices to perform predefined interoperable tasks independent of device manufacturer, operating system, or class of device. Although Bluetooth devices utilize interoperable profiles, these devices use a transceiver that typically provides lower data throughput and shorter range than devices utilizing WiFi technology. As such, it would be desirable to provide a system that is capable of increasing data throughput for sending Bluetooth profile data by utilizing two network protocols such as Bluetooth and WiFi to wirelessly communicate between mobile communication devices.

SUMMARY

In an embodiment, a method for communication between mobile communication devices on a wireless network, the method comprising: establishing a Bluetooth connection (BT connection); establishing an IEEE 802.11 connection; simultaneously maintaining both the BT connection and the IEEE 802.11 connection; and transmitting Bluetooth data packets (BT data packets) over the IEEE 802.11 connection.

In yet another embodiment, an apparatus for simultaneous communication on a wireless network, the apparatus comprising: a primary mobile communication device to establish one or more connections to one or more secondary mobile communication devices; the primary mobile communication device to establish a first connection and a second connection to at least one of the secondary mobile communication devices wherein the first connection is a Bluetooth connection (BT connection) and the second connection is an IEEE 802.11 connection; the primary mobile device to establish a third connection to another secondary mobile communication device wherein the third connection is an IEEE 802.11 connection; and the primary mobile communication device to simultaneously maintain both the BT connection and the IEEE 802.11 connections while the primary mobile communication device simultaneously transmits data to the secondary mobile communication devices.

In still another embodiment, an apparatus for simultaneous communication on a wireless network, the apparatus comprising: a primary mobile communication device to establish one or more connections to a secondary mobile communication device and an Access Point (AP); the primary mobile communication device to establish a first connection and a second connection to the secondary mobile communication device wherein the first connection is a Bluetooth connection (BT connection) and the second connection is an IEEE 802.11 connection; the primary mobile device to establish a third connection to the AP wherein the third connection is a WiFi or IEEE 802.11 connection; and the primary mobile communication device to simultaneously maintain both the BT connection and the IEEE 802.11 connections while the primary mobile communication device simultaneously transmits data to both the secondary mobile communication device and the AP.

DETAILED DESCRIPTION

Figure 1:
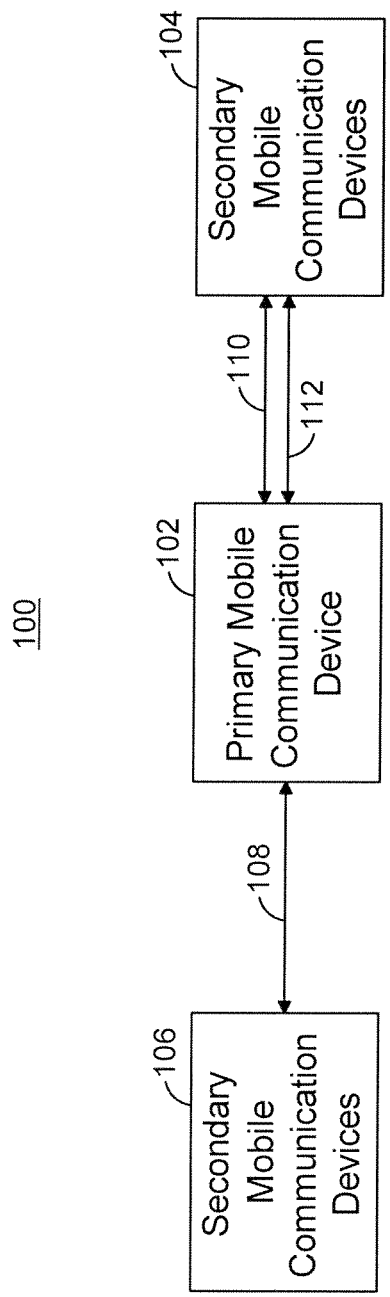
FIG. 1 is a block diagram illustrating a wireless network including a primary mobile communication device wirelessly communicating to secondary mobile communication devices.

FIG. 1 is a block diagram of an example wireless network 100, which may represent a short range or long range network and which may be an ad hoc topology or infrastructure topology with a primary mobile communication device 102 wirelessly communicating to secondary mobile communication devices 104 and 106. In the illustrated example, the primary mobile communication device 102 may be a portable digital assistant (PDA), cellular phone, vehicle, media player, laptop computer, wireless supported desktop computers, gaming systems, wireless networking devices such as routers, switches, etc., or any other portable computing device. Similarly, the secondary mobile communication devices 104 and 106 may be any portable computing device as described herein with respect to the primary mobile communication device 102. In a WLAN environment, the primary mobile communication device 102 and the secondary mobile communication devices 104 and 106 may be compliant with one of the accepted or contemplated wireless communication protocols, of which IEEE 802.11a, 802.11b, 802.11g, 802.11n and Bluetooth (BT), are examples. But these are only provided by way of example. The mobile communication devices 102, 104, 106 may operate under any two or more wireless protocols desired.

As shown in FIG. 1, the primary mobile communication device 102 may wirelessly communicate with two secondary mobile communication devices 104 and 106. The mobile communication device 102 may be a Bluetooth Alternate MAC Physical layer (BT AMP) mobile communication device. Likewise, the secondary mobile communication devices 104 and 106 may be BT AMP mobile communication devices. The primary mobile communication device 102 communicates with the secondary mobile communication devices 104 and 106 through a series of connections 108, 110, and 112, independent of the order in which the connections are established. The data connection 108 may be a standard Bluetooth communication link for transmitting all types of data such as voice, images, text, or sound between the mobile communication devices 102 and 106.

For wireless communications between the mobile communication devices 102 and 104, two connections 110 and 112 may be used. First, a Bluetooth connection (BT connection) 110 may be established between the mobile communication devices 102 and 104 through a Bluetooth scanning and discovery process that creates a connection between the two mobile communication devices 102 and 104. Once the BT connection 110 is established between the mobile communication devices 102 and 104, a WiFi connection 112 may be established between the mobile communication devices 102 and 104. These connections 110 and 112 are referred to herein collectively as the BT 802.11 connection, and may both operate at 2.4 GHz frequency.

Both the BT connection 110 and the WiFi connection 112 may be simultaneously maintained to transmit data. For example, configuration data may be transmitted over the BT connection 110, including data used to create a physical link and a logical link. Multimedia data may be transmitted over the WiFi connection 112, including data such as voice, text, images, sound, etc. Indeed, any type of data such as voice, images, text, or sound may be wirelessly transmitted on the WiFi connection 112 between the mobile communication devices 102 and 104. The data may be transmitted in a BT 802.11 frame which includes 802.11 data and Bluetooth packet profile data. Alternatively, the BT connection 110 may be configured to wirelessly transmit data between the mobile communication devices 102 and 104.

Figure 2:
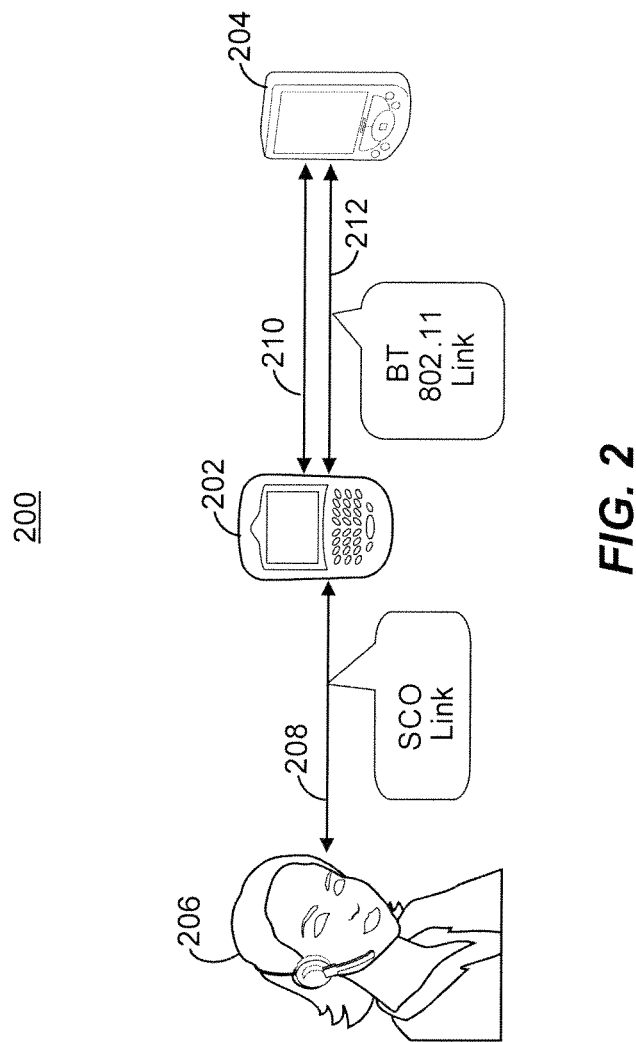
FIG. 2 is a diagram illustrating a wireless network including a Bluetooth Alternate MAC Physical Layer (BT AMP) primary mobile communication device transferring data over a Bluetooth connection, a WiFi connection and Bluetooth Synchronous Connection Orientated (BT SCO) connection to secondary mobile communication devices.
Figure 3:
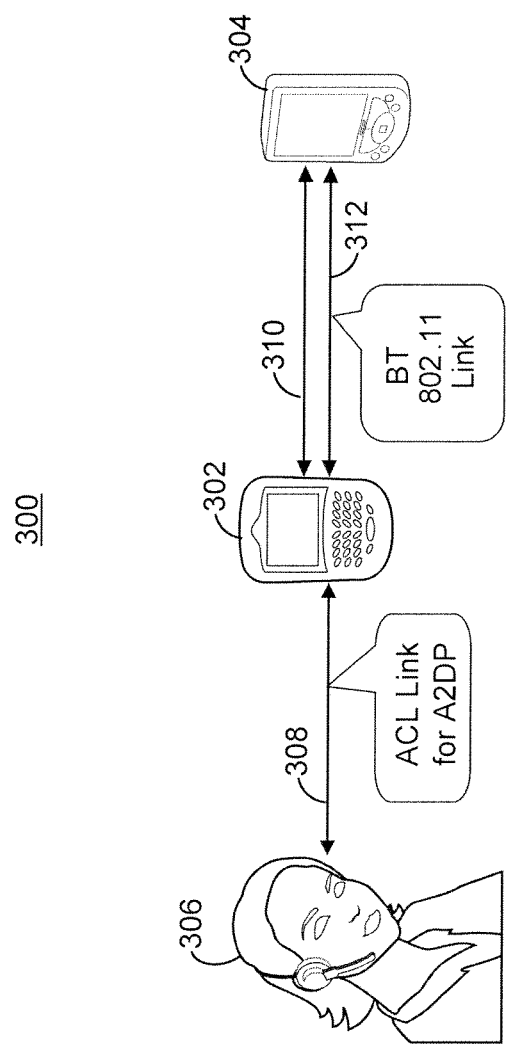
FIG. 3 is a diagram illustrating a wireless network including a BT AMP primary mobile communication device transferring data over a Bluetooth connection, a WiFi Connection and Bluetooth Asynchronous Connectionless Link (BT ACL) connection to secondary mobile communication devices.
Figure 4:
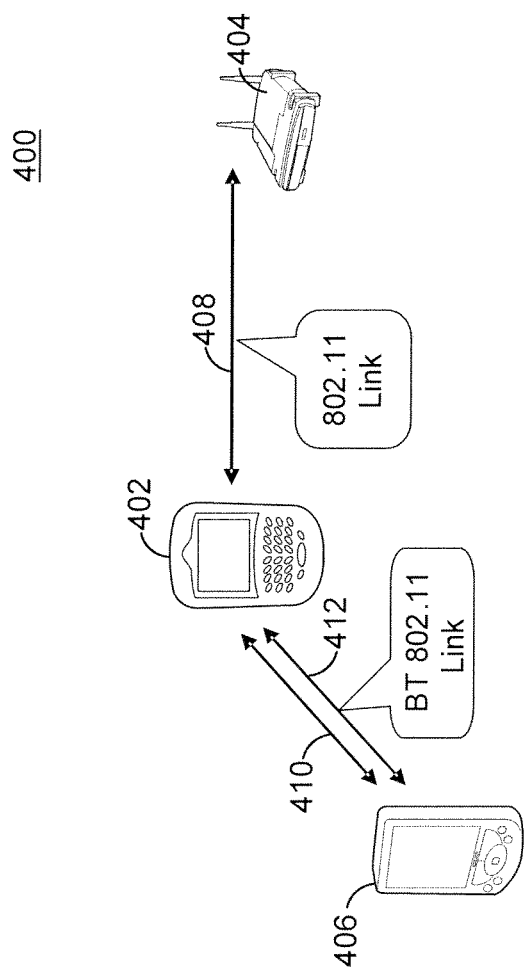
FIG. 4 is a diagram illustrating a wireless network including a BT AMP primary mobile communication device transferring data over a Bluetooth connection and an 802.11 connection to a secondary mobile communication device while simultaneously communicating to an Access Point (AP)

FIGS. 2, 3, and 4 provide an example of various implementations of the mobile communications devices 102, 104 and 106.

FIG. 2 is a diagram of a wireless network 200 having a primary mobile communication device 202 (shown as a mobile handheld computing device) capable of communicating with two secondary mobile communication devices 204 and 206 (206 shown as a Bluetooth ready headset attached to a user). Communication with the device 206 may be achieved over a synchronous connection oriented (SCO) connection 208. Communication with the device 204 is achieved using a BT connection 210 and a WiFi connection 212. The SCO connection 208 is used for transmitting voice data between the devices 206 and 204. The BT connection 210 and the WiFi connection 212 may transmit configuration data and multimedia data, respectively, for example to form a BT 802.11 link. As with the other embodiments described herein, communication between devices 202 and 204 may occur simultaneously as communication between devices 202 and 206 is achieved.

A High Quality Voice 3 (HV3) profile may be sent in a SCO data packet to the secondary mobile communication device 206 over the SCO connection 208. The SCO data packets may occupy 2 consecutive slots out of 6 time slots of SCO data packets, where 30 bytes of data are used in one SCO slot. The WiFi connection 212 may use the remaining 4 slots to transmit Transmission Control Protocol (TCP) packets having Bluetooth profile data. One example of the Bluetooth profile data is the Generic Object Exchange profile.

FIG. 3 is a diagram of a wireless network 300 similar to FIG. 2 but having a primary mobile communication device 302 wirelessly communicating with two secondary mobile communication devices 304 and 306 over an Asynchronous Connection Link (ACL) connection, 308, BT connection 310 and WiFi connection 312. In one embodiment, the ACL connection 308 may be established between the primary mobile communication device 302 and the secondary mobile communication device 306. The ACL connection 308 may be an asynchronous (packet-switched) connection used to send multimedia data between two mobile communication devices. For example, Advanced Audio Distribution Profile (A2DP) data may be transferred between the mobile communication devices 302 and 306. The A2DP data defines how high quality audio (stereo or mono) can be streamed from one device to another over a Bluetooth connection. In this way, music and other data may be streamed from a mobile phone to a wireless headset.

A BT connection 310 and a WiFi connection 312 may be used for transmitting configuration data and multimedia data between the mobile communication devices 302 and 304. An ACL profile may be sent in an ACL data packet to the secondary mobile communication device 306 over the ACL connection 308. The ACL profile may contain a 3-DH5 packet with a total A2DP overhead requirement of 450 kbps. The high rate A2DP with Sub Band Coding (SBC) is about 350 kbps. In one example, 6 slots out of 30 time slots of ACL packet data may be used for ACL traffic over the ACL connection 308. The WiFi connection 312 may use the remaining 24 slots to transmit TCP packets having Bluetooth profile data. In another example, the ACL packets may occupy 4 consecutive slots out of 12. As such, the WiFi connection 312 may use the remaining 8 slots to transmit TCP packets having Bluetooth profile data.

FIG. 4 is a diagram of a wireless network 400 having a primary mobile communication device 402 wirelessly communicating with a secondary mobile communication device 406 and access point (AP) 404 (404 shown as a wireless router). Alternatively, the AP 404 may be a portable base station, mobile base station, or any device capable of sending 802.11 packets. In one embodiment, the 802.11 connection 408 may be established between the primary mobile communication device 402 and the AP 404. Over the 802.11 connection 408, multimedia data may be transferred between the mobile communication device 402 and AP 404. The 802.11 connection 408 may be used to transmit data between the mobile communication devices 402 and AP 404. A BT connection 410 and a WiFi connection 412 may be used for transmitting configuration data and multimedia data between the mobile communication devices 402 and 406.

The 802.11 connection 408 may be maintained with no active data transmission. The IEEE power save mode feature may be used by primary mobile communication device 402 when that device 402 chooses not to receive or transmit data from the AP 404, but still maintain a connection to the AP 404. In other examples, a Target Beacon Transmission Time (TBTT) of 100 ms and a Delivery Traffic Indication Message (DTIM) sent every beacon. As such, at least one of the following options may be used: 1) setting the primary mobile communication device 402 for waking up every TBTT to listen to TIM during a 5 ms period; 2) setting the primary mobile communication device 402 for waking up every DTIM to listen to Broadcast/multicast during a 5-10 ms period; and 3) setting the primary mobile communication device 402 for keeping alive frame every DTIM during a 1 ms period. Alternatively, any IEEE standard such as the PS polling scheme, Power Management Bit scheme, or similar standard may be used to regulate the transmission of data between primary mobile communication device 402 and the AP 404.

Figure 5:
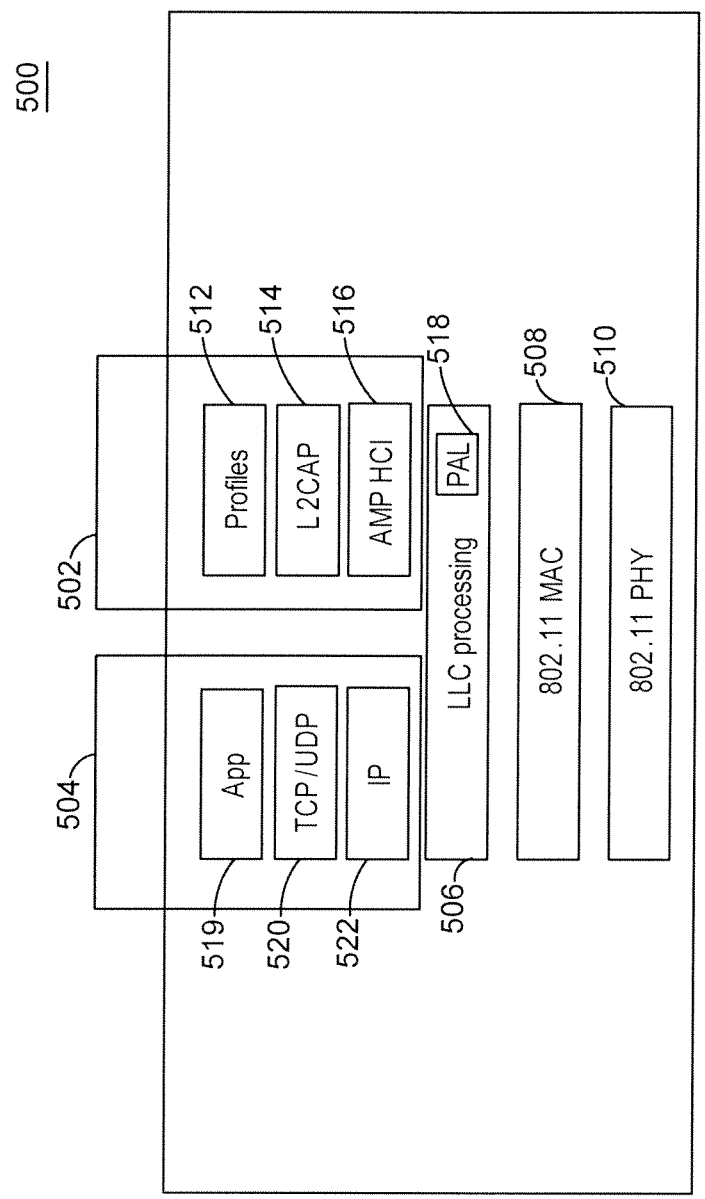
FIG. 5 is a block diagram illustrating an implementation of a BT AMP protocol stack of a mobile communication device.

FIG. 5 illustrates an implementation of a BT AMP protocol stack 500 that may be used in the mobile communication devices 102, 104 and 106 to scan for and establish connections with other (e.g., secondary) Bluetooth and 802.11 capable devices. A protocol stack (also referred to as a communications stack) may include a particular software implementation of a computer networking protocol suite. As shown in FIG. 5, the protocol stack 500 may include: a Bluetooth layer 502, an 802.11 layer 504, a logical link control (LLC) layer 506, an 802.11 media access control (MAC) layer 508, and a 802.11 physical (PHY) layer 510. The Bluetooth layer 502 may include profiles block 512, a logical link control and adaptation protocol (L2CAP) block 514, and an AMP host controller interface (AMP HCI) block 516. The 802.11 layer 504 may include applications (App) block 519, transmission control protocol/user datagram protocol (TCP/UDP) block 520, and internet protocol (IP) block 522. The LLC layer 506 may include a Protocol Adaptation Layer (PAL) 518.

The Bluetooth AMP protocol stack 500 receives an 802.11 frame that includes Bluetooth packet data at the 802.11 PHY layer 510. Next, the 802.11 MAC layer 508 processes the 802.11 frame for addressing and channel access control mechanisms that make it possible for one or more network nodes to communicate within a multipoint network. Thereafter, the LLC layer 506 multiplexes/demulitplexes the 802.11 frame such that the 802.11 data portion and Bluetooth data portion both pass to their respective layers. The processing happens such that simultaneous communications may be achieved over both a Bluetooth connection and WiFi connection.

Creation of the Physical Link and Logical Links Between Mobile Communications Devices The AMP HCI 512 creates a connection (e.g. physical link and logical link) between the BT AMP mobile communication devices. The AMP HCI 512 discovers and associates with another mobile communication device using a 'Create Link' command. A Link Handle signal is returned as a result of creating a physical link between two mobile communication devices. The Link Handle is used as a reference when creating a Logical Connection. The AMP physical link is mapped to the Bluetooth physical link. The logical link is mapped to a connection handle.

In order to transfer data between the BT AMP mobile communication devices, a logical link is required. To create a logical connection, a 'Create Logical Link' command is called and a valid 'Link Handle' is passed as a reference. A 'Connection_Handle' command may be supplied to the host on the successful creation of a logical link.

Multiple logical links can be created over the physical link using the 'Create Logical Link' command and each is referenced by a 'Connection Handle.' The 'Connection Handle' may be used when transferring data and requesting Quality of Service. All data payloads should be encrypted.

To disconnect the physical link and the logical links, the AMP HCI 512 uses 'Disconnect Link' and 'Disconnect Connection' commands sent to another device sent to another device.

Data Transfer Between the Mobile Communication Devices

In one example, the AMP HCI 512 may transfer data between the host and the controller of the two mobile communication devices. For example, L2CAP PDU packets are transferred over the HCI physical transport (not shown), which transport provides flow control and packet mechanisms. As described earlier, the Connection Handles (akin to endpoints) designate the destination address of the data packets. These destination addresses are set up by the Connection mechanism as part of the control plane.

The received data is passed from the AMP layer (which includes LLC layer 506, an 802.11 MAC layer 508, and a 802.11 PHY layer 510) to the PAL 518 based on organizationally unique identifier (OUI) and Bluetooth protocol headers. The data is then forwarded from the MAC layer 508 to the PAL 518 which forwards the data to the HCI physical transport. Next, the packets are received by the L2CAP 514 and de-multiplexed based on channel identifier (CID).

Next, the L2CAP data is sent and received over the HCI logical channels (not shown). The HCI physical transport provides a mechanism for the host and host controller to identify the HCI logical channel as well as the packet length for each packet sent over the HCI physical transport. The mapping of the HCI logical channels to AMP connections may be defined by the PAL specification. The HCI logical layer need not specify any data flow control. The flow control may be specified in the transport specification. Each AMP connection may have a logically distinct HCI and a unique Local_AMP_ID. If there is one HCI physical transport, then the HCI transport driver on the AMP mobile communication devices may require an extra layer of multiplexing in order to differentiate between the two AMP mobile communication devices that are in the same physical package. As a result, there may be only a single HCI transport driver, in some examples.

Referring back to FIG. 1 (in connection with FIG. 5), the AMP HCI 512 iniates the BT connection 110 by performing a scan for other mobile communication devices having BT compatibility and WiFi compatibility. The AMP HCI 512 instructs the AMP managers and controllers to discover BT AMP mobile communication devices. The AMP managers are located in the host of the mobile communication device. The controllers are located in the physical layer of the mobile communication device.

An 802.11 beacon is not required for the discovery of BT AMP mobile communication devices. However, an 802.11 beacon may be used by the BT AMP mobile communication devices to advertise their presence to the BT AMP mobile communication device that is performing the scan.

For maintaining a Bluetooth connection, a scan may be performed for 18 slots of SCO/ACL data packets every 1.28 seconds. As such, the basic rate/extended data rate (BR/EDR) control link consumes 3-4 slots in approximately 2 ms. In another embodiment, BT 802.11 connection may use unused time from transmission of data.

After the scan of identification is complete, the WiFi connection may be created between the mobile communication devices by performing the following steps: generating a probe request signal; sending the probe request signal; and receiving a probe response signal. The BT connection may be a secure connection accomplished using a four way handshake implementation as described in the 802.11 standard. Further, a power save feature may be used in connection with the WiFi connection to transmit data. The BT AMP may control the power save mode or a standard 802.11 power save scheme may be used.

Figure 6:
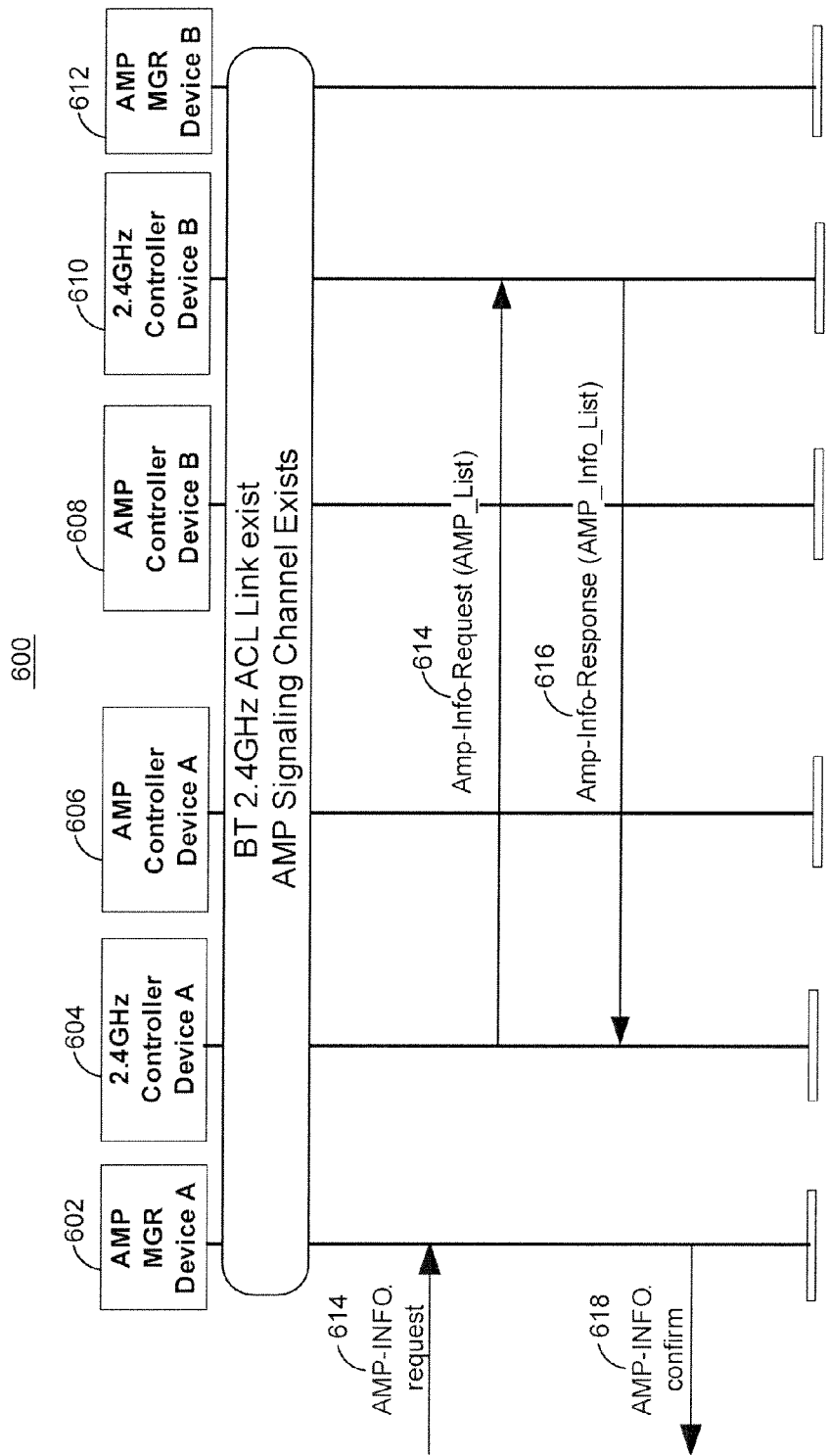
FIG. 6 illustrates a signal diagram for device managers and controllers of a BT AMP mobile communication device discovering another BT AMP mobile communication devices.
Figure 7:
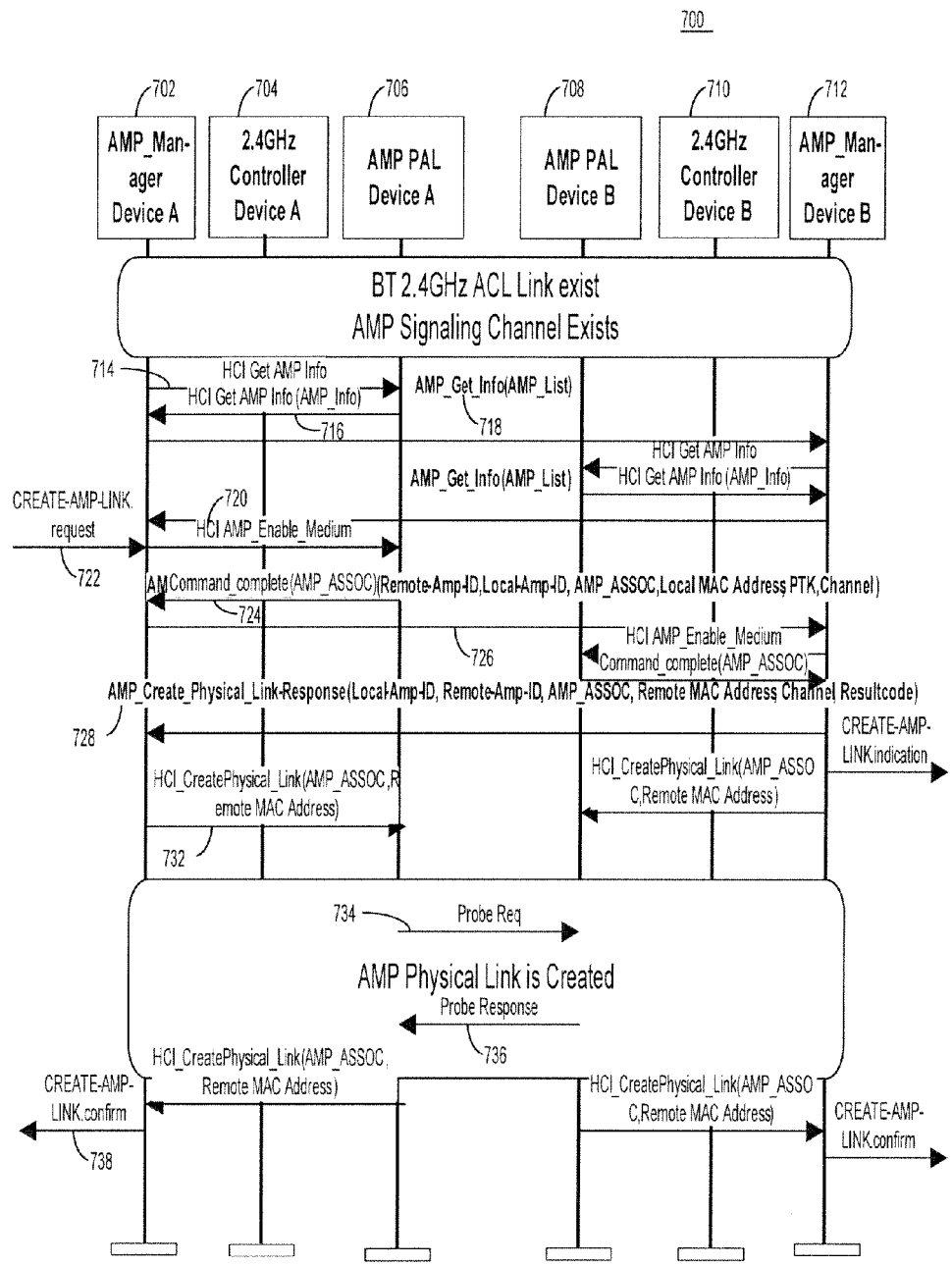
FIG. 7 illustrates a signal diagram indicating the device managers and controllers of two mobile communication devices interacting to create a WiFi physical link.
Figure 8:
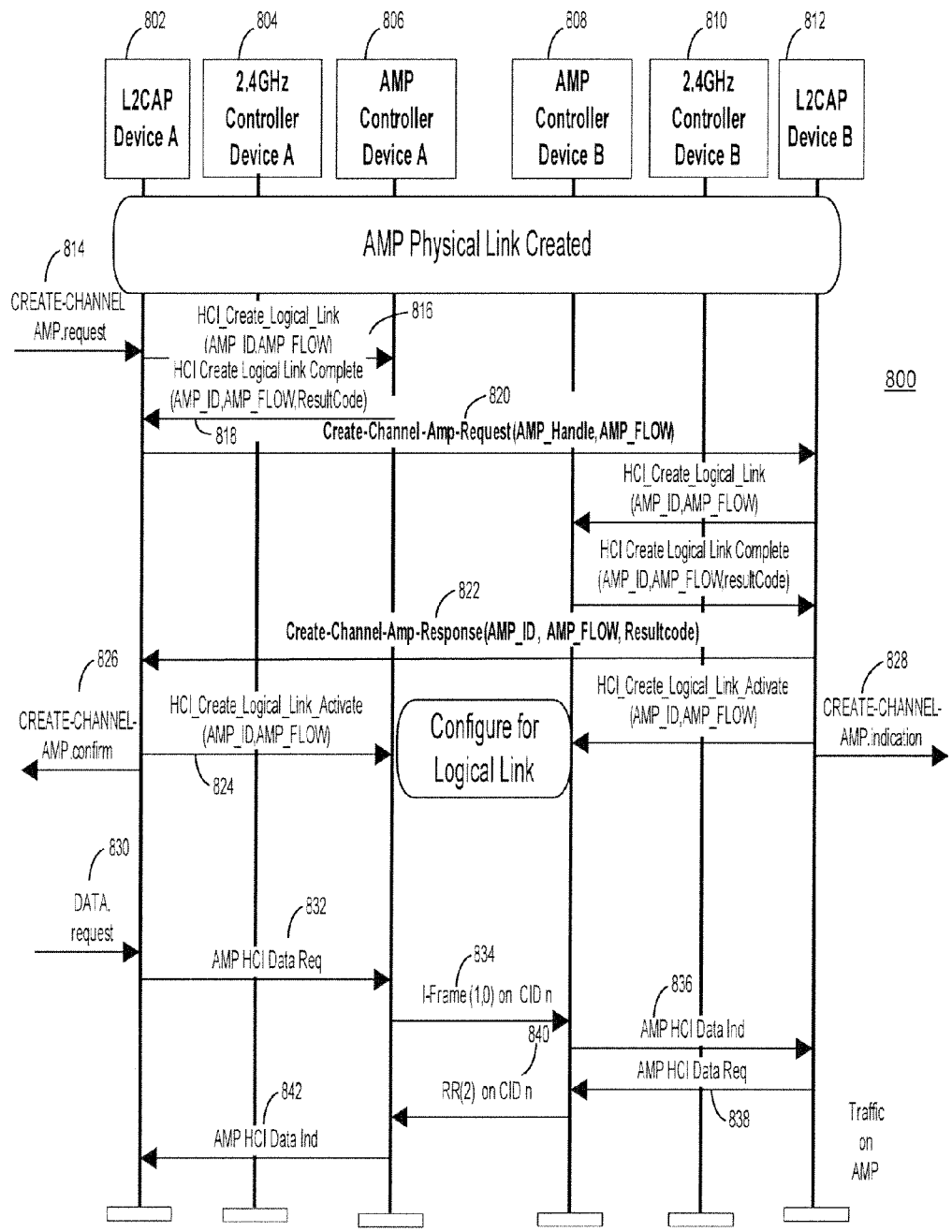
FIG. 8 illustrates a signal diagram indicating the device managers and controllers of two mobile communication devices interacting to create a channel AMP between the mobile communication devices.

FIGS. 6, 7 and 8 describe the interaction of AMP managers and controllers used to detect mobile communication devices that have BT AMP layers and create the BT 802.11 connection.

FIG. 6 illustrates a signal diagram 600 for the device managers and controllers of a BT AMP mobile communication device discovering another BT AMP mobile communication devices 102 and 104 of FIG. 1. The diagram 600 represents a procedure for locating devices with BT AMP layers. Each device such as A and B devices may have device managers and controllers to gather AMP_INFO for establishing the BT connection. As shown in FIG. 6, the AMP MGR 602 of Device A receives a AMP_INFO request signal 616 from a user interface of device A (not shown). Next, the 2.4 GHz controller 604 of device A sends the AMP_INFO request signal 614 to the 2.4 GHz controller 610 of device B. In turn, the 2.4 GHz controller 610 of device B 610 sends an Available-Info-response (AMP_info_List) signal 616 to the 2.4 GHz Controller 604 of device A. As a result, the AMP MGR 602 of device A sends a AMP_INFO confirm signal 618 to the user interface of device A.

The parameters passed in the AMP_INFO response signal are shown in Table 1:

TABLE 1

AMP_StatusEnumeration ENABLED or DISABLED. ENABLED indicates that the AMP is turned on, active and connectable. DISABLED indicates the AMP is turned off or in a low power state.
AMP_TypeEnumeration 2.4 GHz, WiMedia, etc. Indicates the type of the AMP.
FreeBW Integer 4 octets - 0x00000000-0xFFFFFFFE. An estimate of the amount of available bandwidth (free bandwidth) on the AMP specified as a data rate (kbps). It is only valid if the AMP_Status is ENABLED.
AMP_Block Octet String Variable Block of data containing AMP specific characteristics (e.g. supported data rates.)
MinDataSize Integer 4 octets 0x00000000-0xFFFFFFFF, To save power, devices may not want their AMP to be used unless the data transfer meets some minimum size. This parameter states that minimum size. The initiator controls the creation of the AMP link so this is just a hint to help the initiator determine if the AMP should be used for the transfer. "Don't care" is the default value.

FIG. 7 illustrates a signal diagram 700 indicating the device managers and controllers of two mobile communication devices interacting to create a WiFi link. In particular, the diagram 700 represents a procedure for creating the WiFi physical and logical links. The AMP MGR 702 of device A sends an HCI Get AMP Info. signal 714 to the AMP PAL 706 for device A. In response, the AMP PAL 706 for device A returns the AMP_INFO signal 716 to the AMP MGR 702 of device A. Next, the AMP MGR 702 of device A sends the HCI Get AMP Info. signal 714 to the AMP MGR 712 of device B. As a result, the AMP MGR 712 of device B sends the AMP_INFO signal 716 to the AMP PAL 708 of device B. Next, the AMP PAL 708 of device B sends an AMP_Get_Info(AMP_List) signal 718 to the AMP MGR 712 of device B. Also, the AMP PAL 708 of device B sends a HCI AMP_Enable_Medium signal 720 to the AMP MGR 702 of device A. Next, the AMP MGR 702 of device A receives a CREATE-AMP-LINK request signal 722 from the user interface of device A. Thereafter, the AMP MGR 702 of device A passes the CREATE-AMP-LINK request signal 722 to the AMP PAL 706 for device A. In response, the AMP PAL 706 for device A returns AMP_Command_complete signal 724 to the AMP MGR 702 of device A.

Next, the AMP_MGR of device A 702 sends an AMP_Create_Physical_Link Request signal 726 to the AMP_MGR 712 of device B. The AMP_Create_Physical_Link Request signal 726 may include the following parameters: Remote AMP_ID, Local AMP_ID, AMP_Assoc, Local MAC Address, PTK Encryption Key, and Channel Number. The AMP_Create_Physical_Link Request signal 726 may be sent by the initiating Bluetooth controller (BT controller) to create a BT AMP connection. The PTK Encryption key is the encryption key for data over the AMP connection. The AMP_Create_Physical_Link Request signal 726 may be required in order for the AMP PAL 708 to establish a physical link to another AMP device.

Next, the AMP_MGR 712 of device B sends the HCI AMP_Enable_Medium signal 720 to the AMP PAL 708 of device B. In turn, the AMP PAL 708 of device B sends a AMP_Command_complete signal 724 to the AMP_MGR 712 of device B. As a result, the AMP_MGR 712 of device B sends the AMP_Create_Physical_Link_Response signal 728 to the AMP_MGR 712 of device A. The AMP_Create_Physical_Link_Response signal 1028 may comprise the following parameters: Local AMP_ID, Remote AMP_ID, AMP_Assoc, Remote MAC Address, Channel Number, and Response Code.

The AMP_Create_Physical_Link_Response signal 728 may be sent by the destination BT controller to the initiating BT controller in response to a Create Physical Link Request. The AMP_Create_Physical_Link_Response signal 728 may be used in order for the PAL to establish a physical link to another AMP device.

Thereafter, the AMP_MGR 712 of device B sends a CREATE-AMP-LINK indication signal 730 to the user interface of device B. Next, the AMP_MGR 712 of device B sends a HCI_CreatePhysical_Link signal 732 to the AMP PAL 708 of device B. Also, the AMP_MGR 702 of device A sends a HCI_CreatePhysical_Link signal 732 to the AMP PAL 706 of device A. Next, the AMP PAL 706 of device A sends a Probe Request signal 734 to the AMP PAL 708 of device B. In response, the AMP PAL 708 of device B sends a Probe Response signal 736 to the AMP PAL 706 of device A. At this point, the AMP physical link is created.

Thereafter, the AMP PAL 706 of device A sends a HCI_CreatePhysical_Link signal 1032 to the AMP_MGR 1002 of device A. At the same time, the AMP PAL 708 of device B sends a HCI_CreatePhysical_Link signal 732 to the AMP_MGR 712 of device B. Next, both AMP_MGR 702 of device A and the AMP_MGR 712 of device B send CREATE-AMP-LINK confirm signal 738 to the user interface of device A.

FIG. 8 illustrates a signal diagram 800 indicating the device managers and controllers of two mobile communication devices interacting to create a channel AMP between the mobile communication devices. The diagram 800 represents a procedure for locating devices with BT AMP layers. Each device such as A and B devices may have device managers and controllers to gather AMP_info for establishing the BT connection. As shown in FIG. 8, L2CAP 802 of device A receives a CREATE-CHANNEL AMP request signal 814 from the user interface of device A. Next, the L2CAP 802 of device A sends a HCI_Create_Logical_Link signal 816 to the AMP controller 806 of device A. In response, the AMP controller 806 of device A sends a HCI_Create_Logical_Link_Complete signal 818 to the L2CAP 802 of device A. Next, the L2CAP 802 of device A sends a Create_Channel_AMP_Request signal 820 to the L2CAP 812 of device B.

Thereafter, the L2CAP 812 of device B sends a HCI_Create_Logical_Link signal 816 to the AMP controller 808 of device B. In response, the AMP controller 808 of device B sends HCI_Create_Logical_Link_Complete signal 818 to the L2CAP 812 of device B. Next, the L2CAP 812 of device B sends a Create_Channel_AMP_Response signal 822 to the L2CAP 802 of device A. As a result, the L2CAP 802 of device A sends a HCI_Create_Logical_Link_Active signal 824 to the AMP controller 806 of device A. At the same time, the L2CAP 812 of device B sends a HCI_Create_Logical_Link_Active signal 824 to the AMP controller 808 of device B. Next, the L2CAP 802 of device A sends a Create_Channel_AMP confirm signal 826 to the user interface of device A. Likewise, the L2CAP 812 of device B sends a Create_Channel_AMP indication signal 828 to the user interface of device B.

Thereafter, the L2CAP 802 of device A receives a data request signal from the user interface of device A. Next, the L2CAP 802 of device A sends a AMP HCI Data Request signal 832 to the AMP controller 806 of device A. Thereafter, the AMP controller 806 of device A sends I-Frame signal 834 to the AMP controller 808 of device B. As a result, the AMP controller 808 of device B sends an AMP HCI Data Ind signal 836 to the L2CAP 812 of device B. In response, the L2CAP 812 of device B sends an AMP HCI Data Request signal 838 to the AMP controller 808 of device B. Next, the AMP controller 808 of device B sends an RR signal 840 to the AMP controller 806 of device A. In turn, the AMP controller of device A 806 sends an AMP HCI Data Ind 842 signal to the L2CAP 802 of device A.

The following are descriptions of various signals used in the creation of the logical and physical links between the two mobile communication devices described above.

The AMP profile request may be sent by the BT controller to the AMP device. The AMP profile request contains the PTK encryption key which should be used by the 802.11 AMP. At the destination, the AMP profile request may contain the initiator MAC address, channel to be used and the PTK encryption key. The AMP profile request may also be a request for the MAC address for the remote AMP device. The AMP profile request may be used for the PAL to establish a physical link to another AMP device. The PAL 518 sends the MAC address of the 802.11 interface in the response. The PAL may also configure the 802.11 AMP MAC to use the PTK. At the destination, the PAL may configure the 802.11 AMP MAC channel number, receive MAC address and PTK. The PAL also may send the MAC address of the 802.11 interface in the response.

The AMP profile response may be sent by the AMP device to the BT controller. The AMP profile response may contain the MAC address of the 802.11 AMP. The AMP profile response may contain the channel number that can be used for the 802.11 AMP link. The AMP profile response may be used for the PAL to establish a physical link to another AMP device. The PAL may return the MAC address of the 802.11 interface in the response. The PAL may also return the channel number that should be used for 802.11 AMP. The destination 802.11 AMP turns on its radio.

The AMP Create Physical Link Command may cause the PAL to perform all the required actions (turn on the radio, set appropriate channel, or set remote MAC address) in order to make an association to the remote device. If the AMP physical link is already present the PAL shall generate an AMP Physical Link Complete event. The AMP Create Physical Link Command only creates an association between devices and a logical link. Further, AMP Create Physical Link Command must be created in order to transfer data. The AMP Create Physical Link Command may be used for the PAL to establish a physical link to another AMP device. The PAL configures the 802.11 MAC to send a PROBE REQ signal to the remote querying its presence.

The AMP Physical Link Created Event may indicate to the host that the local AMP device and the one specified by the link parameters are associated. The physical link handle is used in further communication between the AMPs to create a logical connection over this link and subsequently send and receive data. The AMP Physical Link Created Event may include the following parameters: AMP_Physical_Link_Handle, AMP_Assoc, and Encryption_Status. The Physical Link Complete Event may be used as a response for the Create Phyiscal Link command. The event may be used to indicate whether a 'Create Physical Link' was successful or not. The Physical Link Complete Event may be generated by the PAL in response to a probe response from the remote 802.11 MAC.

The AMP Physical Link Disconnect Command may be used to signal to the PAL to terminate an existing physical link. The AMP Physical Link Disconnect command may include the following parameter: AMP_Physical_Link_Handle. The AMP Physical Link Disconnect command may cause the PAL to perform all the required actions in order to disassociate itself from the device referenced by the Physical Link Handle. The AMP Physical Link Disconnect command may generate a Physical Link Disconnection Complete event. Local links may be disconnected by the AMP. In this embodiment, there is no corresponding MAC Sublayer Management Entity (MLME) command. Further, the PAL may be used to tear down individual logical links and indicate back to L2CAP.

The AMP Create Logical Link command may cause the PAL to perform all the required actions in order to make a logical link to the remote device. The AMP Create Logical Link command may include the following parameters: AMP_Physical_Handle and AMP_Flow_Spec. Specific constraints of the reservation QoS may be specified by the host using both Create Channel and QoS modification commands. The AMP Create Logical Link command may be used in order for the PAL to establish a unidirectional logical link to another AMP device. The PAL may set up classifiers to classify packet based on flow spec to appropriate Transport Control (TC).

The AMP Logical Link Complete Event may indicate to the host that the local AMP device and the one specified by the link parameters are connected via an agreed QoS channel. On receipt of the event, a secure encrypted channel is available for data transmission. The AMP Logical Link Complete Event may be used in order for the PAL to establish a unidirectional logical link to another AMP device. The PAL may set up classifiers to classify packet based on flow spec to appropriate TC and return with the Complete Event.

The AMP Logical Link Disconnect command may inform the AMP of the termination of the logical link. The AMP Logical Link Disconnect command may include the following parameters: AMP Physical_Handle and AMP_Logical_Handle. The PAL may reset the classifier attached to the logical link.

The AMP Logical Link Disconnect Event may inform the host that the logical link has been terminated. The AMP Logical Link Disconnect command may include the following parameter: AMP_Physical_Handle and AMP_Logical_Handle. The AMP Logical Link Disconnect Command may be used to tear down a logical link.

Referring back to FIG. 5, the AMP HCI 512 controls the PAL 518 to assist with the logical connections and physical connection between the mobile devices.

Figure 9:
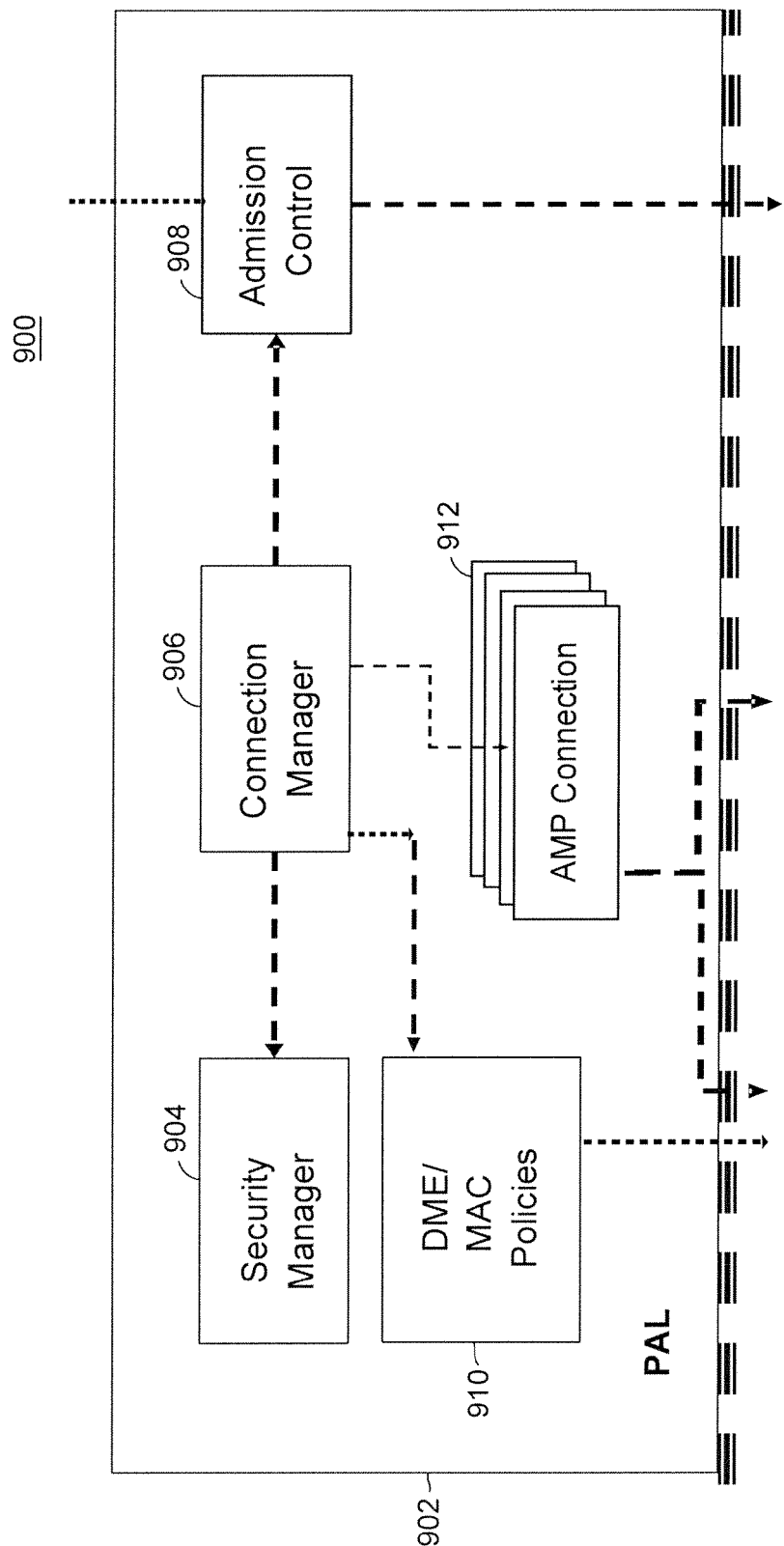
FIG. 9 illustrates a block diagram indicating the functional blocks in the PAL.

FIG. 9 illustrates a block diagram 900 indicating the functional blocks in the PAL. As shown in FIG. 9, the PAL may contain a Security Manager 904, a Connection Manager 906, an Admission Control block 908, a Digital Medium/Media Access Control (DME/MAC) policies 910 and AMP Connection block 912.

The connection manager 906 is configured to realize connection requests and manage AMP connections. The connection manager 906 may use the services of the Security Manager 904 to perform security checks. Additionally, the Connection Manager 906 may use the services of the Admission Control 908 to allow flow control.

The AMP Connection block 912 may be configured to represent a single connection. This single connection includes a logical and physical link. The AMP Connection 912 may also be configured to request the Quality of Service (QoS) contracts. The AMP Connection 912 may also comprise a Link Manager and Stream Manager. The Link Manager may be configured to discover and establish a communication link. The Stream Manager may be configured to maintain logical links.

The Admission Control block 908 may be configured to provide admission control based on QoS request. Additionally, the Admission Control 908 may perform other tasks as known by those skilled in the art. The Security Manager 904 may be configured to manage four way authentication and encryption for UWB link. Further, the Security Manager 904 may be configured to plum the PTK encryption key.

Figure 10:
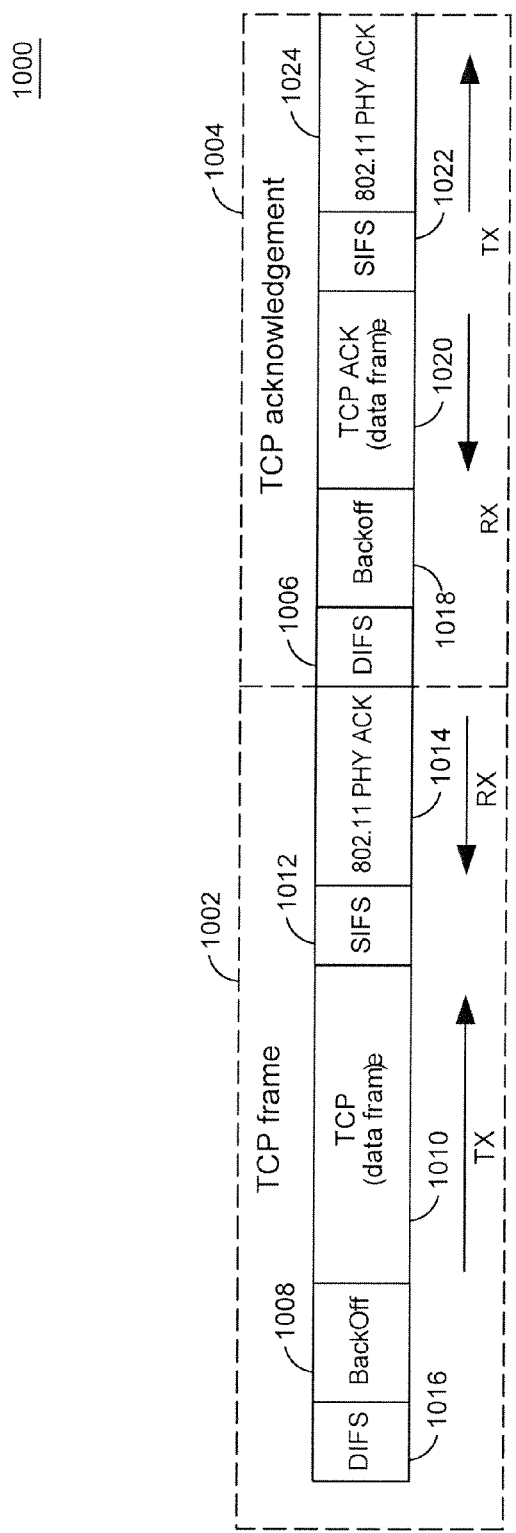
FIG. 10 is a diagram illustrating an 802.11 data packet/frame transmitted over an 802.11 connection between two mobile communication devices.

FIG. 10 illustrates an 802.11 data packet/frame 1000 transmitted over the BT 802.11 connection between the mobile communication devices 102 and 104 shown in FIG. 1. As shown in FIG. 10, the data packet/frame 1000 may include two portions: a TCP frame 1002 and a TCP acknowledgement (ACK) 1004. The TCP frame 1002 may include: DCF interframe space (DIFS) block 1006; backoff block 1008; TCP data frame block 1010; short interframe space (SIFS) block 1012; and 802.11 PHY ACK block 1014. The TCP acknowledgement portion may include: DIFS block 1016; backoff block 1018; TCP data frame block 1020; SIFS block 1022; and 802.11 PHY ACK block 1024.

Figure 11:
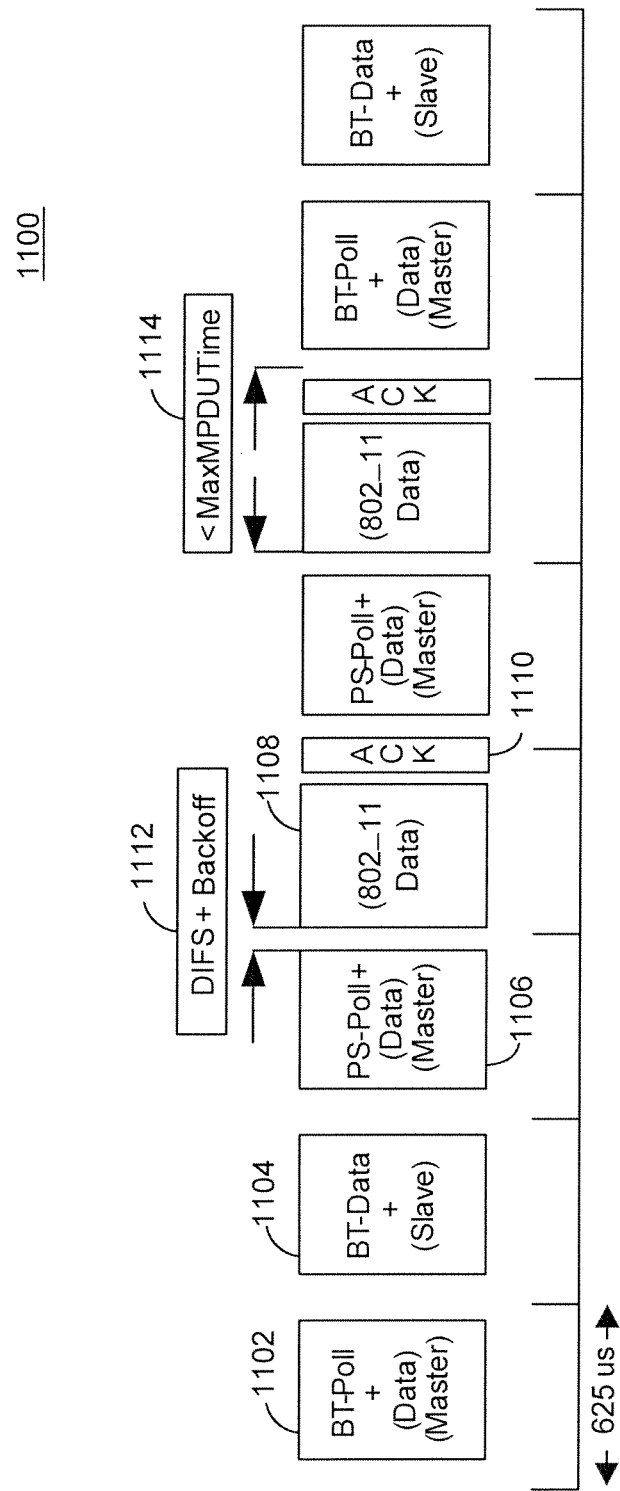
FIG. 11 is a diagram illustrating the transmission of a Bluetooth data packet and an 802.11 data packet over an 802.11 connection using a polling-the-slave-per-packet data transmission scheme.
Figure 12:
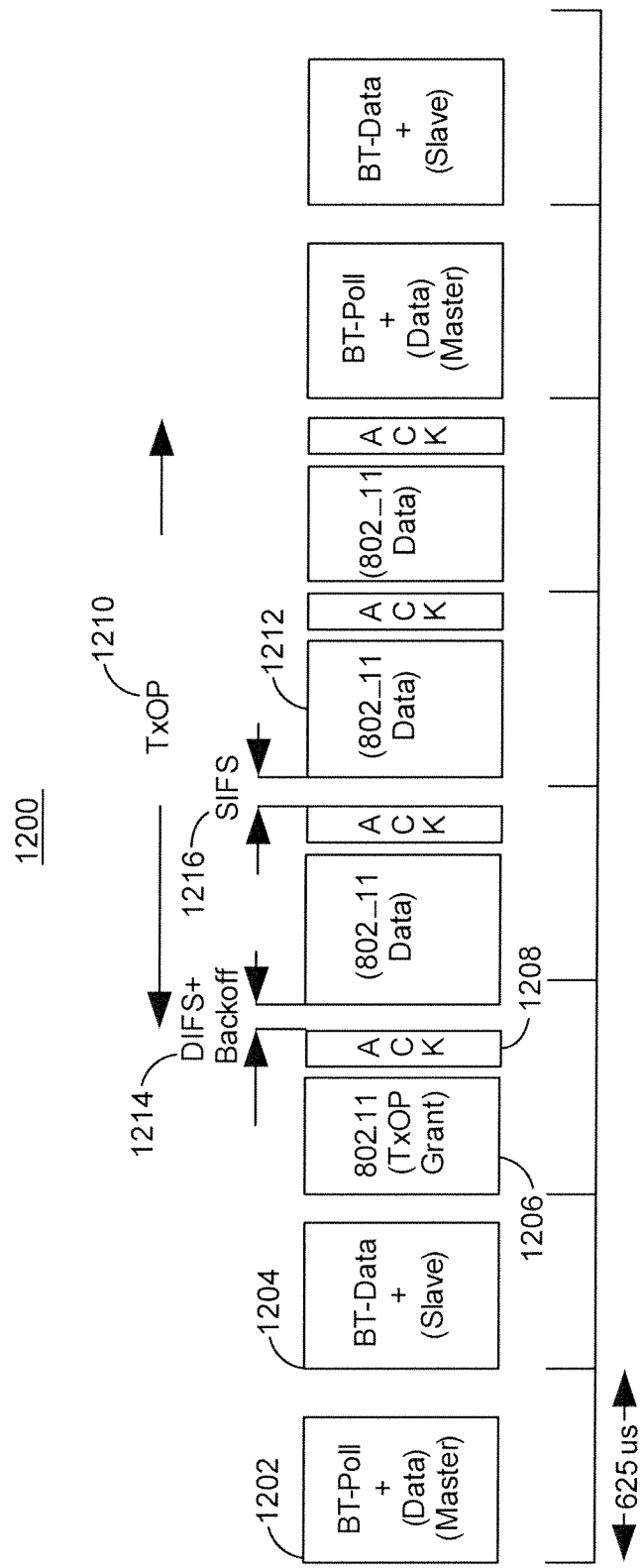
FIG. 12 is a diagram illustrating the transmission of a Bluetooth data packet and an 802.11 data packet/frame over a Bluetooth connection and an 802.11 connection using a Transmission Opportunity (TxOP)-to-the-slave data transmission scheme.

FIGS. 11 and 12 show two transmission schemes that may be used to transmit BT data packets and 802.11 data packets between mobile communication devices 102, 104 and 106 shown in FIG. 1. The transmission of BT packets and 802.11 packets may be achieved by at least two ways: 1) polling-the-slave-per-packet transmission scheme and 2) providing-a-transmission opportunity (TxOP)-to-slave transmission scheme.

FIG. 11 illustrates the polling of Bluetooth data and 802.11 data in a packet/frame 1100 transmitted over the BT 802.11 connection from the slave to master using the polling-the-slave-per-packet data transmission scheme. As shown in FIG. 11, the data packet/frame 1100 may contain the following portions: BT-Poll+(Data) (Master) block 1102; BT-Data+ (Slave) block 1104; PS-Poll+(Data) (Master) block 1106; 802_11 data block 1108; ACK block 1110; DIFS+backoff block 1112; and MaxMPDUTime block 1114. Each slot for the data packet is 625 μs.

In one example (referring to FIG. 11 in conjunction with FIG. 2), the primary mobile communication device 202 sends a BT-Poll+(Data)(Master) block signal 1102 to a secondary mobile communication device 206 over the SCO connection

208. In response, the secondary mobile communication device 206 sends a BT-Data+(Slave) block signal 1104 over the SCO connection 208. At the same time, the primary mobile communication device 202 sends a PS-Poll+(Data) (Master) block signal 1106 to the secondary mobile communication device 204 over the WiFi connection 212. Next, the primary mobile communication device 204 sends 802_11 data block signal 1108 over the WiFi connection 212. The 802_11 data block signal 1108 includes Bluetooth profile data. In response, the secondary mobile communication device 212 sends ACK block signal 1110 to the primary mobile communication device 202 over the WiFi connection 212. The data transmission may be repeated as many times as possible for the duration of the transmission cycle.

The duration of the data transmission over the SCO connection 208 and WiFi connection 212 may be based on the link manager protocol (LMP) MaxSlotSize value transmitted to the slave. In another example, the slave may identify the end of the transmission of Bluetooth packets and transmit 802.11 packets, after which, the master may receive 802.11 packets and stop scheduling Bluetooth slots so as to prevent simultaneous transmission of packets. The packet transmission time from the slave to the master does not exceed MaxMPDUTime. The master may not poll the slave if time left to transmit MAC Protocol Data Unit (MPDU) is less than MaxMPDUTime.

In some examples, transmission from master to slave may be controlled by the master. For example, the master may transmit 802.11 packets following Distributed Coordination Function (DCF) rules when no BT packet transmission is scheduled. The master may schedule the transmission from slave to master. The slave may or may not know when the master is transmitting ACL traffic to the slave. Additionally, the slave may not know when the master polls other slave for data transmission.

FIG. 12 illustrates BT packets and 802.11 packets in a data packet/frame 1200 transmitted from the slave to the master by providing a Transmission Opportunity (TxOP) to the slave. As shown in FIG. 12, the data packet/frame 1200 may include the following portions: BT-Poll+(data) (master) block 1202; BT-data+(slave) block 1204; 802.11 (TxOp grant) block 1206; ACK block 1208; TxOP segment block 1210; DIFS+ backoff block 1214; and SIFS block 1216. The TxOP segment 1210 may include three (3) 802_11 data packets blocks 1212 and three (3) ACK blocks 1208. Each slot for the data packet is 625 μs.

In one example (referring to FIG. 12 in conjunction with FIG. 2), the primary mobile communication device 202 sends a BT-Poll+(Data)(Master) block signal 1202 to a secondary mobile communication device 206 over the SCO connection 208. In response, the secondary mobile communication device 206 sends a BT-Data+(Slave) block signal 1204 over the SCO connection 208. At the same time, the primary mobile communication device 202 sends a 802.11 (TxOp grant) block signal 1206 to the secondary mobile communication device 204 over the WiFi connection 212. In response, the secondary mobile communication device 204 sends an ACK block signal 1208 to the primary mobile communication device 202 over the WiFi connection 212. Next, the primary mobile communication device 204 sends (802_11 data) block signal 1212 over the WiFi connection 212. The (802_11 data block) signal 1212 may include Bluetooth profile data. In response, the secondary mobile communication device 212 sends another ACK block signal 1208 to the primary mobile communication device 202 over the WiFi connection 212. The data transmission of (802_11 data) block signal 1212 and ACK block signal 1208 may be repeated as many times as possible for the duration of the transmission cycle.

In one embodiment, the master may provide a TxOP grant to the slave, and the slave may use Transmission TxOP opportunity to transmit multiple MAC Protocol Data Unit (MPDU) to slave or master. The TxOP opportunity may be identified by at least one of the following ways: 1) duration and 2) absolute end time. For the first, the desired duration should be exact. Additionally, the packet that contains the duration should undergo zero back off, and be inserted by the designated hardware.

When identified by absolute end time, both mobile communication devices may be synchronized to the same time base using beacons. Further, both mobile communication devices may transmit beacons with the time stamp inserted by the designated hardware. The steps for identifying the TxOP by the absolute end time may include: sending a probe response from the master mobile communication device to the slave mobile communication device; embedding the absolute end time in the data packet; computing the delta of the timing synchronization function (TSFs); and determining the local absolute end time. A processor (stored in the mobile communication devices) may compute the delta of the TSFs and determine its local absolute end time. In still another example, the probe response has the TSF of the transmitter (embedded in the mobile communication devices). In yet another example, the transceiver may not transmit past its local absolute end time. In a similar fashion, the master may not transmit the probe response packet if the end time is passed.

FIGS. 13A-13F illustrate various devices in which a BT AMP layer may be added part of these devices protocol stack, as described above.

Figure 13A:
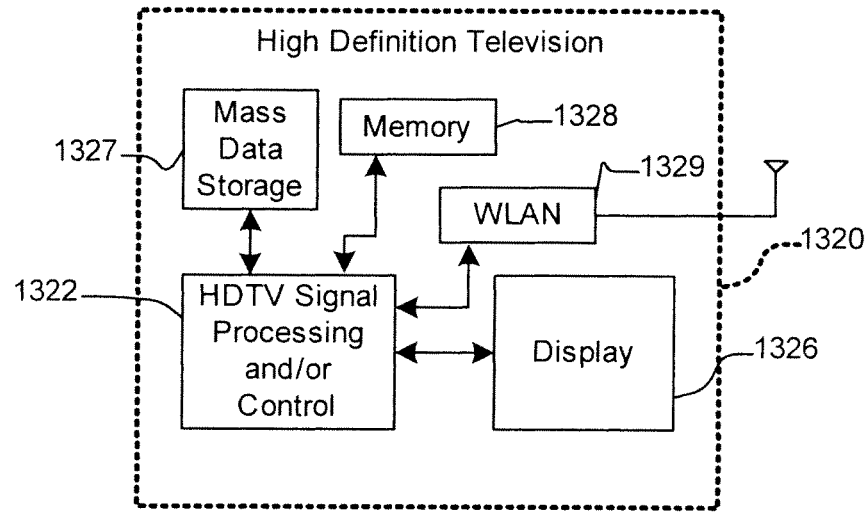
FIGS. 13A-13F illustrate various devices in which a BT AMP layer may be added part of these devices protocol stack.

Referring now to FIG. 13A, such techniques may be utilized in a high definition television (HDTV) 1320. HDTV 1320 includes a mass data storage 1327, an HDTV signal processing and control block 1322, a wireless interface 1329 and memory 1328. HDTV 1320 receives HDTV input signals in either a wired or wireless format and generates HDTV output signals for a display 1326. In some implementations, signal processing circuit and/or control circuit 1322 and/or other circuits (not shown) of HDTV 1320 may process data, perform coding and/or encryption, perform calculations, format data and/or perform any other type of HDTV processing that may be required. In one embodiment, a logic unit may manage data communication with a remote unit (now shown) over a suitable wired or wireless connection, such as Bluetooth or 802.11. The logic unit 1324, remote unit, or both, may use the devices and techniques described above. The remote unit may be a cordless headset or remote viewer that accepts data streamed from the logic unit. Alternatively, the remote unit may be a media player, such as a personal portable player or a personal computer that streams data to the logic unit.

The HDTV 1320 may communicate with a mass data storage 1327 that stores data in a nonvolatile manner such as optical and/or magnetic storage devices. HDTV 1320 may be connected to memory 1328 such as RAM, ROM, low latency nonvolatile memory such as flash memory and/or other suitable electronic data storage. HDTV 1320 also may support connections with a suitable wireless connection via a wireless network interface 1329. The wireless network interface 1329, the HDTV signal processing and control block 1322, may all also implement a BT AMP configuration for transmitting data via the wireless network 1329 or to the display 1326, respectively.

Figure 13B:
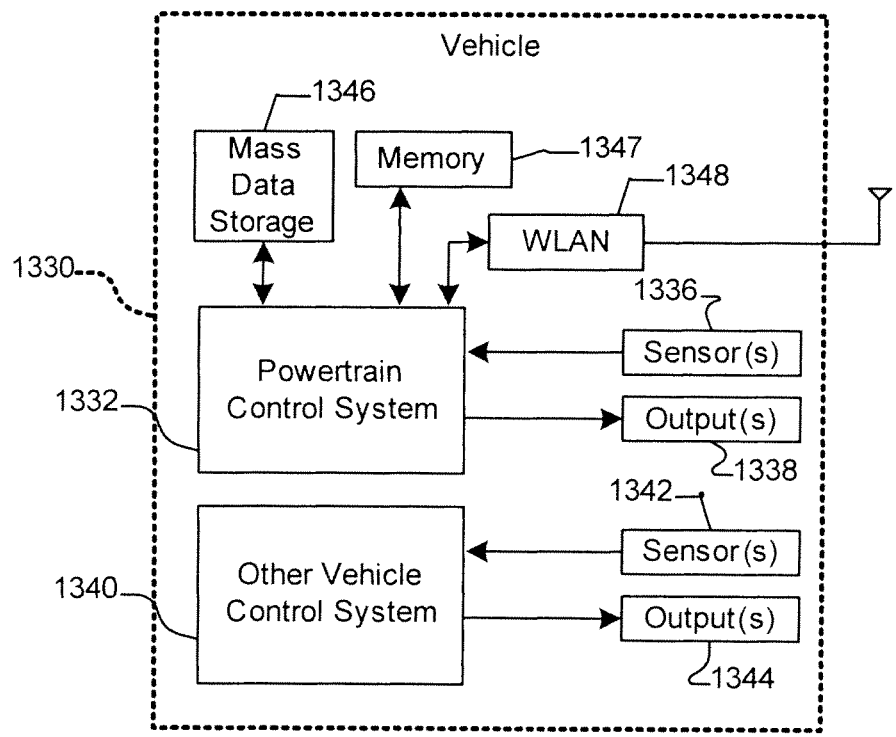

Referring now to FIG. 13B, such techniques may be utilized in a vehicle 1330. The vehicle 1330 includes a control system that may be a powertrain control system 1332, as well as a wireless interface 1348. The powertrain control system 1332 may receive inputs from one or more sensors 1336 such as temperature sensors, pressure sensors, rotational sensors, airflow sensors and/or any other suitable sensors and/or generate one or more output control signals 1338 such as engine operating parameters, transmission operating parameters, and/or other control signals.

Control system 1340 may likewise receive signals from input sensors 1342 and/or output control signals to one or more output devices 1344. In some implementations, control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like.

The powertrain control system 1332 may be connected to memory 1347 such as RAM, ROM, low latency nonvolatile memory such as flash memory and/or other suitable electronic data storage. The powertrain control system 1332 also may support connections with a external devices via a wireless network interface 1348. In one exemplary embodiment, the control system 1340 may include a logic unit for data communication with a remote device (not shown). For example, the remote device may be an entertainment unit supported by the control system 1340. In another embodiment, the remote device may be a source of data, such as a personal media player. In yet another embodiment, the remote device 1343 may be a removable BT AMP diagnostic unit.

Figure 13C:
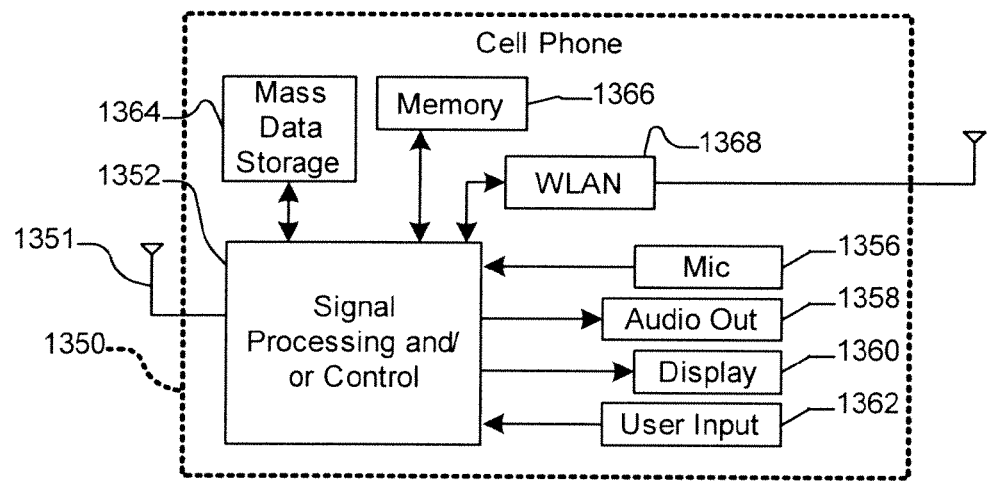

Referring now to FIG. 13C, such techniques may be used in a mobile phone 1350. The mobile phone 1350 may include a cellular antenna 1351 and either or both signal processing and/or control circuits, which are generally identified in FIG. 13C at 1352. A logic unit may be used to support low power data streaming. The mobile phone 1350 may also include a wireless network interface 1368. In some implementations, mobile phone 1350 includes a microphone 1356, an audio output 1358 such as a speaker and/or audio output jack, a display 1360 and/or an input device 1362 such as a keypad, pointing device, voice actuation and/or other input device. A remote device (not shown), for example, a hands-free unit, may send and receive data to the signal processing and/or control circuits 1352. The signal processing and/or control circuits 1352 may also process data, perform coding and/or encryption, perform calculations, format data and/or perform other mobile phone functions.

Mobile phone 1350 may communicate with a mass data storage that stores data in a nonvolatile manner such as optical and/or magnetic storage devices, for example hard disk drives HDD and/or DVDs. Mobile phone 1350 may be connected to memory 1366 such as RAM, ROM, low latency nonvolatile memory such as flash memory and/or other suitable electronic data storage. Mobile phone 1350 also may support connections with a wireless network via a wireless network interface 1368 that may use BT AMP techniques for communication with automotive accessories, such as in-vehicle displays, speakers, or personal accessories, such as the hands-free unit.

Figure 13D:
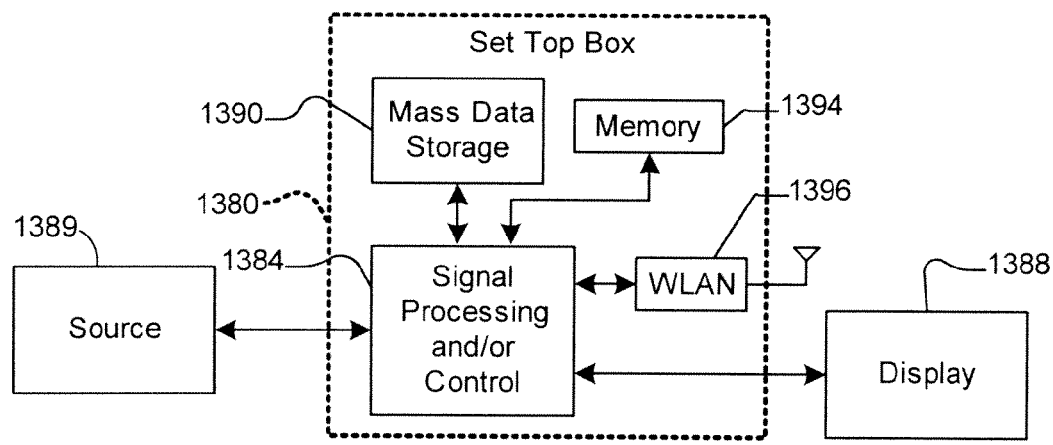

Referring now to FIG. 13D, such techniques may be utilized in a set top box 1380. The set top box 1380 may include a signal processing and/or control circuit which is generally identified in FIG. 13D at 1384. Set top box 1380 receives signals from a source 1389, such as a broadband source or entertainment system, and outputs standard and/or high definition audio/video signals suitable for a display 1388 such as a television and/or monitor and/or other video and/or audio output devices. Signal processing and/or control circuit 1384 and/or other circuits (not shown) of the set top box 1380 may process data, perform coding and/or encryption, perform calculations, format data and/or perform any other set top box function.

Set top box 1380 may communicate with mass data storage 1390 that stores data in a nonvolatile manner. Mass data storage 1390 may include optical and/or magnetic storage devices for example hard disk drives HDD and/or DVDs. Set top box 1380 may be connected to memory 1394 such as RAM, ROM, low latency nonvolatile memory such as flash memory and/or other suitable electronic data storage. Set top box 1380 also may support connections with a wireless network via a suitable wireless network interface 1396. The BT AMP configuration may also be used by the wireless network for transmission of data to a remote device 1389.

Figure 13E:
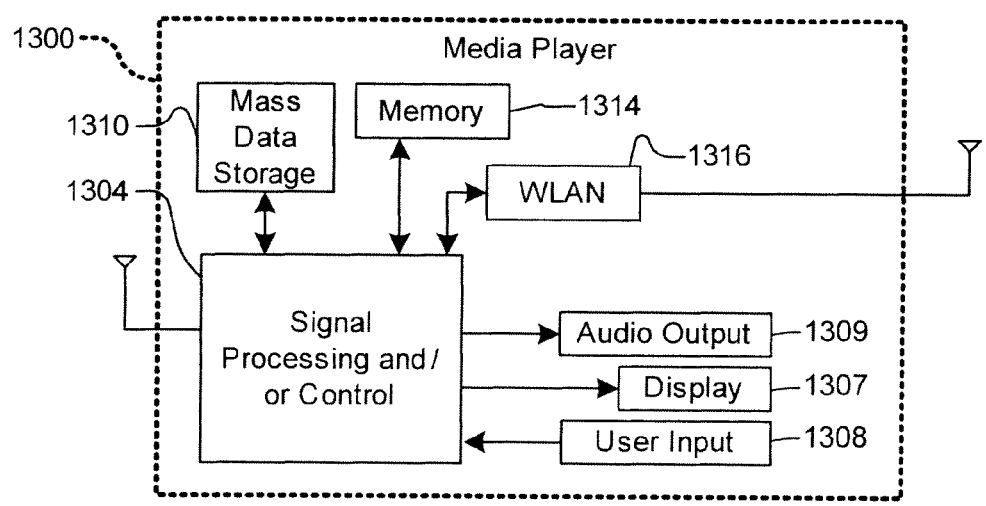

Referring now to FIG. 13E, such techniques may be used in a media player 1300. The media player 1300 may include either or both signal processing and/or control circuits, which are generally identified in FIG. 13E at 1304, a wireless interface 1316 and/or mass data storage 1310 of the media player 1300. In some implementations, media player 1300 includes a display 1307 and/or a user input 1308 such as a keypad, touchpad and the like, that may be connected via a remote interface, such as Bluetooth. In some implementations, media player 1300 may employ a graphical user interface (GUI) that typically employs menus, drop down menus, icons and/or a point-and-click interface via display 1307 and/or user input 1308. Media player 1300 further includes an audio output 1309 such as a speaker and/or audio output jack or wireless connections to a headset, via Bluetooth, for example, or another appropriate wireless protocol. The headset may receive data from the signal processing and/or control circuits 1304. Signal processing and/or control circuits 1304 and/or other circuits (not shown) of media player 1300 may process data, perform coding and/or encryption, perform calculations, format data and/or perform any other media player function, such as implement a logic unit for the BT AMP layer.

Media player 1300 may communicate with mass data storage 1310 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. Media player 1300 may be connected to memory 1314 such as RAM, ROM, low latency nonvolatile memory such as flash memory and/or other suitable electronic data storage. Media player 1300 also may support connections with a wireless network via a wireless network interface 1316. The use of BT AMP techniques may also be applied to data transmitted via the wireless network interface 1316, for example, from a remote device (not shown). The remote device may be a server, personal computer, or DVD player used to download media objects to the media player 1300. Alternatively, the remote device may be another media player and BT AMP may be used for sharing media between the media player 1300 and the remote device.

Figure 13F:
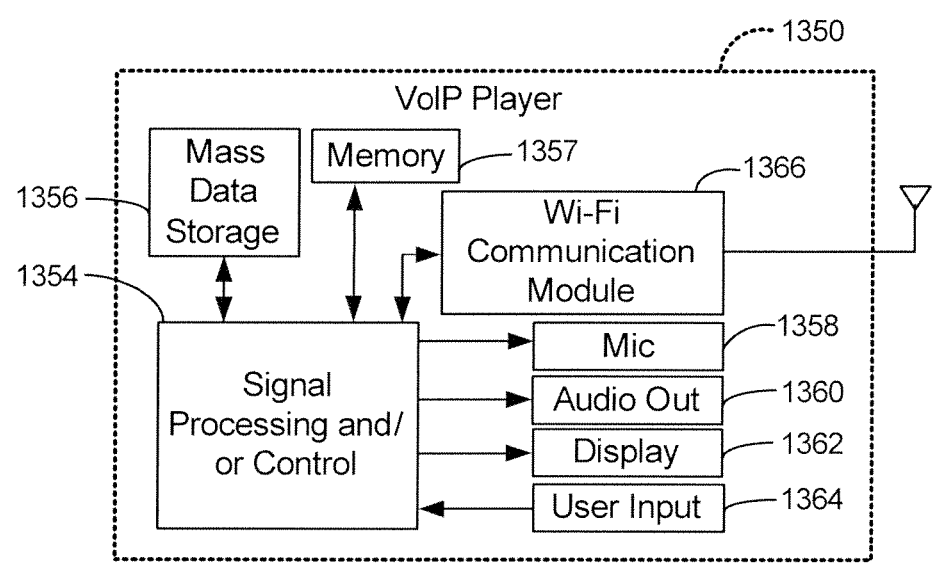

Referring to FIG. 13F, such techniques may be utilized in a Voice over Internet Protocol (VoIP) phone 1350. The VoIP phone 1350 may include an antenna and either or both signal processing and/or control circuits, which are generally identified in FIG. 13F at 1354, a wireless interface 1366 and/or mass data storage of the VoIP phone 1350. In some implementations, VoIP phone 1350 includes, in part, a microphone 1358, an audio output 1360 such as a speaker and/or audio output jack, a display monitor 1362, an input device 1364 such as a keypad, pointing device, voice actuation and/or other input devices. Any of the input or output elements could be remote and connected via a network, such as, Bluetooth, the wireless interface 1366, or both. Signal processing and/or control circuits 1354 and/or other circuits (not shown) in VoIP phone 1350 may process data, perform coding and/or encryption, perform calculations, format data and/or perform other VoIP phone functions, including support for low power data streaming.

VoIP phone 1350 may communicate with mass data storage 1356 that stores data in a nonvolatile manner such as optical and/or magnetic storage devices, for example hard disk drives HDD and/or DVDs. VoIP phone 1350 may be connected to memory 1357, which may be a RAM, ROM, low latency nonvolatile memory such as flash memory and/or other suitable electronic data storage. VoIP phone 1350 is configured to establish communications link with a VoIP network via a broadband Internet Protocol (IP) connection (not depicted). The wireless interface 1366 may be used to support the IP connection, but may also be used to communicate with a cordless handset (not shown) used in a telephone call. Low-power data streaming techniques may be used when communicating data via the wireless interface 1366. Low power data streaming may also be used for a connection to an accessory 1361, such as a BT AMP Bluetooth headset, coupled to the microphone 1358 and audio output 1360 connections.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for communication between mobile communication devices on a wireless network, the method comprising:
   performing a scan to detect a secondary communication device, wherein scanning includes receiving one or more beacons from the secondary communication device;
   determining if the secondary communication device has an available Bluetooth Alternate MAC Physical (BT AMP) layer based on the one or more beacons;
   establishing a Bluetooth connection (BT connection) between a primary communication device and the secondary communication device;
   establishing an IEEE 802.11 connection between the primary communication device and the secondary communication device;
   establishing a logical BT connection over the IEEE 802.11 connection in response to determining the availability of a Bluetooth Alternate MAC Physical (BT AMP) layer on the secondary communication device;
   simultaneously maintaining the BT connection, the logical BT connection, and the IEEE 802.11 connection; and
   transmitting and receiving i) Bluetooth data packets (BT data packets) over the logical BT connection, ii) IEEE 802.11 data packets over the IEEE 802.11 connection, and iii) Bluetooth (BT) configuration data over the Bluetooth connection.

2. The method of claim 1, wherein the BT data packets are transmitted over the IEEE 802.11 connection in an IEEE 802.11 data frame.

3. The method of claim 1, wherein the BT data packets include a Bluetooth profile (BT profile).

4. The method of claim 1, wherein the established IEEE 802.11 connection uses unused time for transmitting BT data packets.

5. The method of claim 1, wherein establishing the BT connection further comprises:
   generating a probe request signal from the Alternate Media Access Control Physical Protocol Abstraction Layer (AMP PAL) of the primary communication device;
   transmitting the probe request signal from the AMP PAL of the primary communication device; and
   receiving a probe response signal from an AMP PAL of the secondary communication device.

6. An apparatus for simultaneous communication on a wireless network, the apparatus comprising:
   a primary communication device to scan and detect one or more secondary communication devices, wherein scanning includes receiving one or more beacons from the one or more secondary communication devices;
   the primary communication device to determine if the one or more secondary communication devices have an available Bluetooth Alternate MAC Physical (BT AMP) layer based on the one or more beacons;
   the primary communication device to establish a first connection and a second connection to at least one of the secondary communication devices, wherein i) the first connection is a Bluetooth connection (BT connection), and ii) the second connection is an IEEE 802.11 connection;
   the primary communication device to establish a logical BT connection to the at least one of the secondary communication devices over the second connection in response to determining the availability of a BT AMP layer on the at least one of the secondary communication devices;

the primary communication device to transmit and receive Bluetooth data packets (BT data packets) over the logical BT connection, IEEE 802.11 data packets over the IEEE 802.11 connection, and BT configuration data over the Bluetooth connection; and the primary communication device to simultaneously maintain the logical Bluetooth connection, the BT connection and the IEEE 802.11 connection.

7. The apparatus of claim 6, wherein the data is Bluetooth data packets (BT data packets).

8. The apparatus of claim 6, wherein the data is IEEE 802.11 data packets.

9. The apparatus of claim 8, wherein the primary communication device schedules the transmission of BT data packets and IEEE 802.11 data packets.

10. The apparatus of claim 9, wherein the primary communication device schedules the transmissions of IEEE 802.11 data packets after the transmission of BT data packets using a polling-the-slave-per-packet transmission scheme.

11. The apparatus of claim 10, wherein the primary communication device is to poll the one or more secondary communication devices to schedule transmission.

12. The apparatus of claim 10, wherein the primary communication device is to poll the one or more secondary communication devices after transmission of BT data packets.

13. The apparatus of claim 10, wherein the primary communication device is to poll the one or more secondary communication devices, and the one or more secondary communication devices in response are to allow the primary communication device to schedule the transmission of BT data packets and IEEE 802.11 data packets.

14. The apparatus of claim 10, wherein the primary communication device will not poll the one or more secondary communication devices if an amount of time before a next schedule transmission of BT data packets is below a threshold amount of time.

15. The apparatus of claim 14, wherein the one or more secondary communication devices will cease transmission of BT data packets if the threshold amount of time expires.

16. The apparatus of claim 9, wherein the primary communication device schedules the transmissions of BT data packets and IEEE 802.11 data packets based on the time between Bluetooth scheduled transmissions using a Transmission Opportunity (TxOP)-to-the-slave transmission scheme.

17. The apparatus of claim 16, wherein the primary communication device grants a TxOP duration based on a time available between Bluetooth master scheduled transmissions.

18. The apparatus of claim 16, wherein the primary communication device schedules the transmissions of BT data packets and IEEE 802.11 data packets such that the BT data packets and IEEE 802.11 data packets do not interfere.

19. The apparatus of claim 7, wherein the primary communication device is to establish a third connection to another secondary communication device, wherein the third connection is an 802.11 connection and the another secondary communication device is an Access Point (AP).

20. An apparatus for simultaneous communication on a wireless network, the apparatus comprising:
a primary communication device to scan and detect a secondary communication device , wherein scanning includes receiving one or more beacons from the secondary communication device;
determining if the secondary communication device has an available Bluetooth Alternate MAC Physical (BT AMP) layer based on the one or more beacons;
the primary communication device to establish one or more connections to the secondary communication device and an Access Point (AP);
the primary communication device to establish a first connection and a second connection to the secondary communication device, wherein the first connection is a Bluetooth connection (BT connection) and the second connection is a first IEEE 802.11 connection;
the primary communication device to establish a logical BT connection to the secondary communication device over the second connection in response to determining the availability of a BT AMP layer on the secondary communication device;
the primary device to establish a third connection to the AP wherein the third connection is a second IEEE 802.11 connection; and
the primary communication device to simultaneously maintain the BT connection, the logical BT connection and the first IEEE 802.11 connection while the primary communication device simultaneously transmits data to both the secondary communication device and the AP.

21. The apparatus of claim 20, wherein the data is Bluetooth data packets (BT packet data).

22. The apparatus of claim 20, wherein the data is IEEE 802.11 data packets.

23. The apparatus of claim 20, wherein the AP is a wireless router.

24. The apparatus of claim 20, wherein the primary communication device is operable to simultaneously receive data from both of the secondary communication devices while the primary communication device simultaneously maintains both the BT connection and the IEEE 802.11 connection.

25. The apparatus of claim 20, wherein the primary communication device schedules the transmissions of BT data packets and IEEE 802.11 data packets using a polling-the-slave-per-packet transmission scheme.

* * * * *